United States Patent [19]
Nakamura et al.

[11] Patent Number: 6,044,321
[45] Date of Patent: Mar. 28, 2000

[54] INTELLIGENT CRUISE CONTROL SYSTEM FOR MOVING BODY

[75] Inventors: Mitsuru Nakamura; Kazuhiko Hanawa; Kazuo Matsuura, all of Hitachinaka; Satoru Kuragaki, Hitachi, all of Japan

[73] Assignee: Hitachi, Ltd., Tokyo, Japan

[21] Appl. No.: 08/871,887

[22] Filed: Jun. 9, 1997

[30] Foreign Application Priority Data

Jun. 7, 1996 [JP] Japan .................................. 8-145918

[51] Int. Cl.⁷ .................................................. B60K 31/00
[52] U.S. Cl. .............................. 701/96; 180/179; 342/71
[58] Field of Search .............................. 701/93, 96, 301; 180/170, 178, 179; 342/70, 71; 123/349; 303/193

[56] References Cited

U.S. PATENT DOCUMENTS

| | | | |
|---|---|---|---|
| 3,725,921 | 4/1973 | Weidman et al. | 343/7 ED |
| 5,197,562 | 3/1993 | Kakinami et al. | 180/169 |
| 5,485,892 | 1/1996 | Fujita | 180/167 |
| 5,493,302 | 2/1996 | Woll et al. | 342/71 |
| 5,495,251 | 2/1996 | Gilling et al. | 342/70 |
| 5,594,645 | 1/1997 | Nishimura et al. | 364/426.044 |
| 5,684,473 | 11/1997 | Hibino et al. | 340/903 |
| 5,695,020 | 12/1997 | Nishimura | 180/169 |
| 5,749,426 | 5/1998 | Gilling | 180/167 |

*Primary Examiner*—Michael J. Zanelli
*Attorney, Agent, or Firm*—Evenson, McKeown, Edwards & Lenahan, PLLC

[57] ABSTRACT

An intelligent cruise control system is capable of maintaining a car-to-car distance allowing a collision to be avoided and carrying out follow-up running control without providing a sense of incompatibility to the driver. A radar circuit employed in a radar unit calculates a relative speed Vr of a car running ahead of a vehicle with an intelligent cruise control system installed therein with respect to the vehicle and a distance dr from the vehicle to the preceding car from a wave reflected by the preceding car. An ICC unit adjusts the speed of the vehicle by controlling the output of the engine of the vehicle in accordance with information such as the relative speed Vr and the distance dr received from the radar unit. In a follow-up running mode, the ICC unit controls the cruise of the vehicle in such a way that the speed of the vehicle and the distance from the vehicle to the preceding car are maintained at a target speed and a target car-to-car distance respectively. When the ICC unit forms a judgment that deceleration of the vehicle is not enough if only deceleration based on the engine brake is relied on, giving rise to fear of a rear-end collision of the vehicle with the preceding car, the ICC unit calculates a target deceleration and operates an automatic brake unit, letting the automatic brake unit generate a braking force appropriate for the target acceleration.

15 Claims, 14 Drawing Sheets

FIG.1
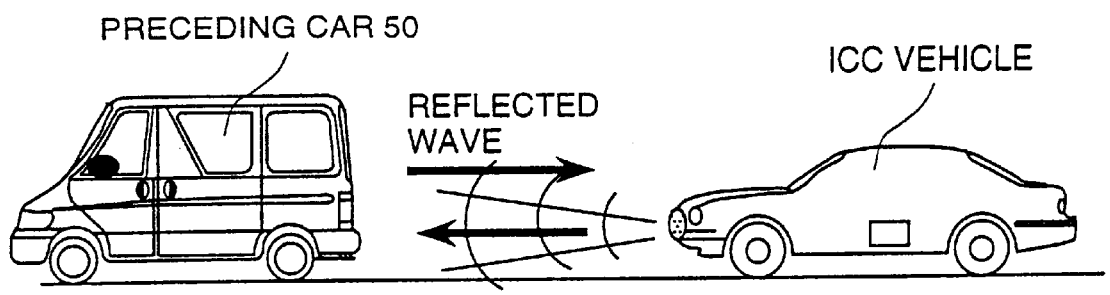
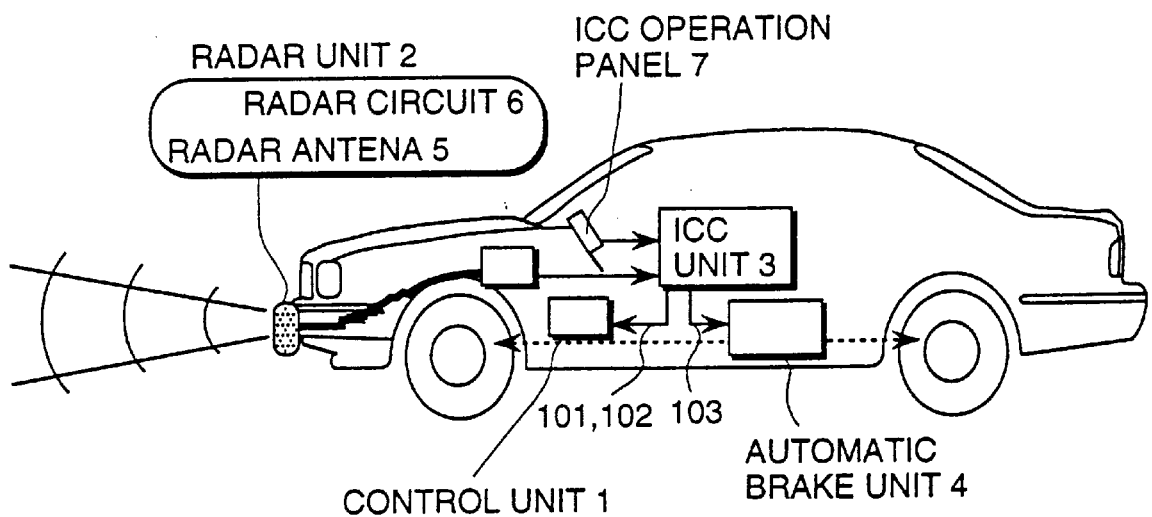
FIG.1A

FIG. 7A
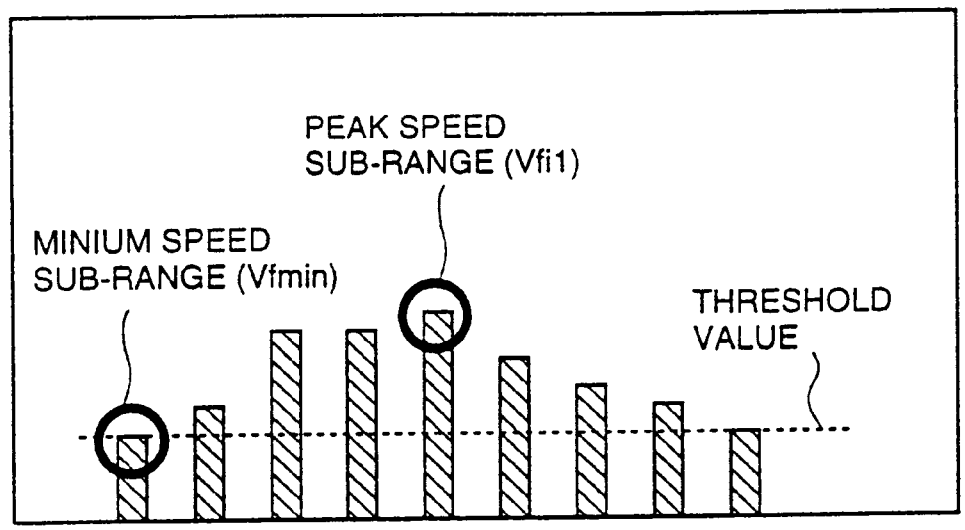
(A) RUNNING ON A CITY ROAD
(LARGE CHANGES IN SPEED)
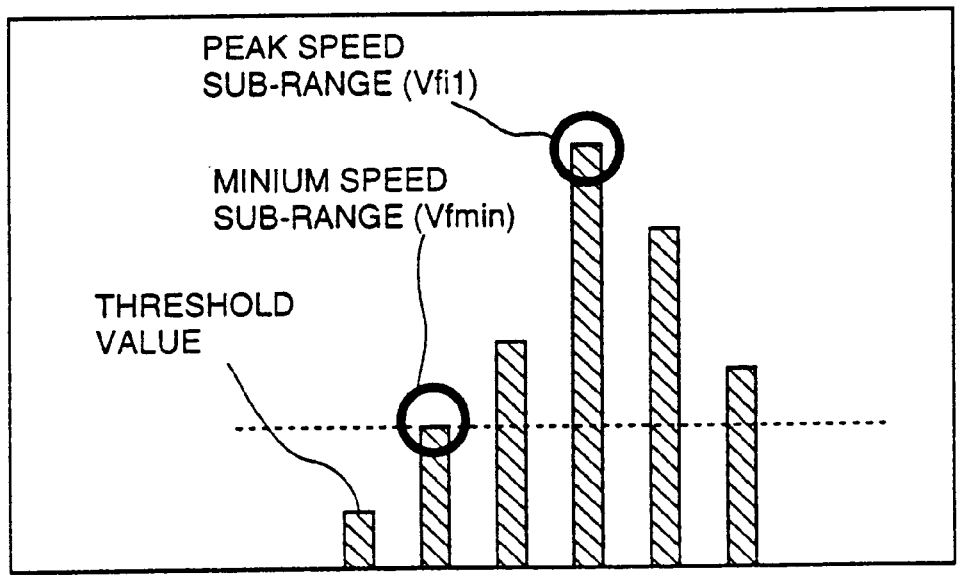
(B) RUNNING ON A HIGHWAY
(SMALL CHANGES IN SPEED)
FIG. 7B

INTELLIGENT CRUISE CONTROL SYSTEM FOR MOVING BODY

BACKGROUND OF THE INVENTION

The present invention relates to an intelligent cruise control system for a moving body. The cruise control system is capable of detecting a distance from the moving body to a car running ahead of the moving body or the speed of the preceding car relative to the moving body by means of a radar installed on the moving body or the like, allowing the moving body to accelerate and decelerate automatically so as to maintain a safe distance from the moving body to the preceding car.

An effort to put a so-called auto cruise control apparatus to practical use has been in progress since an early time and has become widely popular among general vehicles. The cruise control apparatus is a constant-speed running apparatus capable of automatically maintaining the running speed of a vehicle at a constant speed set by the driver in advance.

Even though auto cruise control apparatuses are built from different hardware, they have all but the same system configuration. That is to say, the system configuration of most auto cruise control apparatuses comprises: a controller for carrying out control so as to make the difference between a speed signal received from a speed sensor as a feedback and a target speed equal to zero; an actuator for adjusting the degree of opening of a throttle in accordance with a control signal output by the controller; and an operation switch for setting auto cruise control.

In addition, the operation switch has facilities including: a set switch for setting a target speed in the course of running; a cancel switch for canceling a set target speed; and a resume/coast switch which is used for implementing acceleration or deceleration by increasing or decreasing the target speed when the resume/coast switch is being operated (typically by being pressed) continuously during constant-speed running control.

However, the conventional technology described above has problems described as follows.

The auto cruise control apparatus is basically designed for a vehicle which is running while maintaining a constant speed. An operation to increase or decrease the speed, that is, to change the speed of the vehicle, is carried out by the driver by operating a switch. For this reason, it is necessary for the driver to frequently carry out a manual operation on the switch in a circumstance wherein the speed of the vehicle or the distance from this vehicle to a car running ahead of this vehicle, which is also referred to hereafter as a car-to-car distance, changes frequently as is the case with a vehicle running on a city road. In addition, when the car running ahead of the vehicle reduces its speed all of a sudden, causing the distance from the vehicle to the preceding car to be shortened suddenly, deceleration by the auto cruise control apparatus alone will not be fast enough. When this happens, it is necessary for the driver to apply a brake in most cases. Further, as the brake is applied, the auto cruise control is suspended inadvertently. In order to resume the auto cruise control, it is again necessary for the driver to operate the switch.

The problems described above prove that the auto cruise control is inconvenient in a variety of respects. The application scope of the auto cruise control apparatus is limited to highways in which the amount of traffic is relatively small. As on-board equipment, the auto cruise control apparatus thus lacks appeal or user friendliness.

On the other hand, the research of a so-called ICC (Intelligent Cruise Control) apparatus has been conducted aggressively in recent years. An ICC apparatus is a type of equipment which is capable of detecting a distance from a vehicle using the ICC apparatus installed therein to a car running ahead of the vehicle or the speed of the preceding car relative to the vehicle by means of a radar installed on the vehicle or the like, allowing the vehicle to accelerate and decelerate automatically, that is, to adjust the speed thereof automatically, so as to maintain a safe distance from the vehicle to the preceding car. The ICC apparatus is disclosed in, among other documents, Japanese Patent Laid-open No. Hei 5-221253.

Since this ICC apparatus is still at a research stage, however, a variety of problems encountered in putting the apparatus to practical use will have to be solved. Even if control is exercised so that the distance from a vehicle with an ICC apparatus installed therein to a car running ahead of the vehicle can be maintained at a target value, for example, there will still be a problem as to whether or not the vehicle is controlled by the ICC apparatus in accordance with the driving sense of a human being and whether or not the control using the ICC apparatus results in a sense of incompatibility.

In addition, in the course of a cruise on an ordinary city road, the traffic condition changes often due to, among other causes, moving and stopping in accordance with a traffic light, a transition from one traffic lane to another made by a car running ahead of the vehicle, an interruption by a car running behind the vehicle, passing by another car and crossing a center line by an opportunity traveling car. However, it is still difficult to say that a control system embracing the contemporary technology has reached a level at which the system is capable of controlling a vehicle so as to operate the vehicle with a high degree of safety and accuracy in keeping up with all such traffic circumstances. Thus, if the vehicle can not keep up with a change in traffic condition, that is, for example, if an imminent rear-end collision of the vehicle with a preceding car can not be avoided by relying only on the decelerating power of the ICC apparatus, it is necessary for a safe-driving support system to provide the driver with accurate information in order to let the driver carry out a proper operation.

SUMMARY OF THE INVENTION

It is thus an object of the present invention to provide an intelligent cruise control system or, to be more specific, a running-speed adjusting apparatus to be employed in a vehicle which is capable of carrying out control in accordance with real traffic conditions and in accordance with what is desired by the driver.

The present invention is made to achieve the object described above. According to a first aspect of the present invention, there is provided an intelligent cruise control system to be employed in a moving body for controlling the cruise of the moving body, the system comprising: a distance detecting means for measuring a distance from the moving body to an object existing in front of the moving body (referred to hereafter simply as an object of attention); a speed detecting means for measuring the speed of the moving body; a braking-distance estimating means for estimating a distance along which the moving body travels to decelerate to a specially set speed (referred to hereafter as a deceleration target speed); and a deceleration means for comparing a distance estimated by the braking-distance estimating means (referred to hereafter simply as an estimated braking distance) with a distance measured by the distance detecting means and for decelerating the moving body if a comparison result indicates that the estimated braking distance is longer.

In this case, it is desirable to provide the intelligent cruise control system for a moving body according to the first aspect of the present invention with: a constant-speed running means for letting the moving body run at a specially determined target speed; and a target-speed modifying means for comparing the estimated braking distance with a distance measured by the distance detecting means and for reducing the target speed if a comparison result indicates that the estimated braking distance is longer.

According to a second aspect of the present invention, there is provided an intelligent cruise control system for a moving body for controlling the cruise of the moving body, the system comprising: a distance detecting means for measuring a distance to an object existing in front of the moving body (referred to hereafter simply as an object of attention); a relative-speed detecting means for measuring a relative speed of the moving body with respect to the object of attention; a speed detecting means for measuring the speed of the moving body; a time-to-collision estimating means for estimating a time to a collision of the vehicle with the object of attention from a relative speed measured by the relative-speed detecting means and a distance measured by the distance detecting means; a braking-time estimating means for estimating a time it takes to decelerate the moving body to a specially determined speed (referred to hereafter as a deceleration target speed); and a deceleration means for comparing a time estimated by the braking-time estimating means (referred to hereafter simply as an estimated braking time) with a time estimated by the time-to-collision estimating means and for decelerating the moving body if a comparison result indicates that the estimated braking time is longer.

In this case, it is desirable to provide the intelligent cruise control system for a moving body according to the second aspect of the present invention with: a constant-speed running means for letting the moving An body run at a specially determined target speed; and a target-speed modifying means for comparing the estimated braking time with a time estimated by the time-to-collision estimating means and for reducing the target speed if a comparison result indicates that the estimated braking time is longer.

It is even more desirable to provide each of the intelligent cruise control systems for a moving body according to the first and second aspects of the present invention with: a speed monitoring means for measuring the speed of the moving body or the object of attention; a minimum-monitored-speed determining means for selecting a speed representing a lowest speed range as a minimum monitored speed among speed ranges each with a speed-occurrence count equal to or greater than a predetermined threshold value with the speed-occurrence count obtained as a result of monitoring carried out by the speed monitoring means during a specially determined period of time; and a deceleration-target-speed determining means for determining the deceleration target speed based on the minimum monitored speed.

It should be noted that the deceleration-target-speed determining means described above can use the minimum monitored speed as the deceleration target speed as it is.

According to a third aspect of the present invention, there is provided an intelligent cruise control system for a moving body for controlling the cruise of the moving body, the system comprising: a speed monitoring means for measuring the speed of the moving body or an object existing in front of the moving body (referred to hereafter simply as an object of attention); a monitored-speed determining means for selecting a speed representing a highest speed range as a monitored speed among speed ranges each with a speed-occurrence count equal to or greater than a predetermined threshold value with the speed-occurrence count obtained as a result of monitoring carried out by the speed monitoring means during a specially determined period of time; a target-speed determining means for determining the target speed based on the monitored speed; and a constant-speed running means for letting the moving body run at the determined target speed.

It should be noted that the target-speed determining means described above can use the monitored speed as the target speed as it is.

It is desirable to provide each of the intelligent cruise control systems for a moving body according to the first, second and third aspects of the present invention with: a distance adjusting means provided with distance data representing a relation between the speed of the object of attention or the moving body and the distance from the moving body to the object of attention, the distance adjusting means used for adjusting the speed of the moving body so as to maintain the distance from the moving body to the object of attention at a value defined by the distance data; operation means to be operated by the driver to issue a command requesting car-speed adjustment; and a distance-data updating means for updating the distance data by shortening the distance from the moving body to the object of attention associated with a current speed of the object of attention or the moving body as requested by a command for increasing the speed of the moving body issued as a result of operating the operation means, and for updating the distance data by conversely lengthening the distance from the moving body to the object of attention associated with a current speed of the object of attention or the moving body as requested by a command for decreasing the speed of the moving body issued as a result of operating the operation means.

In this case, the operation means can be an accelerator pedal and a brake pedal.

It is even more desirable to provide each of the intelligent cruise control systems for a moving body according to the first, second and third aspects of the present invention with: a relative-speed control means for adjusting the speed of the moving body by modifying specially determined control gains so as to decrease the relative speed of the moving body with respect to the object of attention; operation means to be operated by the driver to issue a command requesting car-speed adjustment; and a gain adjusting means for increasing the control gains in accordance with a command for raising the speed of the moving body issued as a result of operating the operation means and, on the other hand, for decreasing the control gains in accordance with a command for reducing the speed of the moving body issued as a result of operating the operation means.

It is desirable to provide the deceleration means employed in each of the intelligent cruise control systems according to the first and second aspects of the present invention with a brake; a storage means for storing in advance brake-start-distance data showing a relation between the speed of the object of attention or the moving body and a distance from the moving body to the object of attention at which an operation of the brake is to be started; a brake control means which is used for operating the brake at a point in time at which a distance measured by the distance detecting means reaches a distance defined in the brake-start-distance data; an operation means to be operated by the driver to issue a command for canceling deceleration by using the brake; a brake operating means to be operated by the driver to issue a command for carrying out deceleration by using the brake; and a brake-start-distance-data updating means which is used for updating the brake-start-distance data by: lengthening a distance defined in the brake-start-distance data for a current speed of the object of attention or the moving body in a traffic circumstance wherein a distance measured by the distance detecting means is shorter than the distance defined in the brake-start-distance data for the current speed of the object of attention or the moving body in accordance with a command for canceling deceleration of the moving body issued as a result of operating the operation means; and shortening a distance defined in the brake-start-distance data for a current speed of the object of attention or the moving body in a traffic circumstance wherein a distance measured by the distance detecting means is longer than the distance defined in the brake-start-distance data for the current speed of the object of attention or the moving body in accordance with a command for requesting deceleration of the moving body issued as a result of operating the operation means.

According to a fourth aspect of the present invention, there is provided an intelligent cruise control system for a moving body for controlling the cruise of the moving body provided with an engine and a brake, the system comprising: an attention-object detecting means for measuring the distance from the moving body to a body existing in front of the moving body (referred to hereafter simply as an object of attention), the relative speed of the object of attention with respect to the moving body and an angle formed by a line connecting the moving body to the object of attention and the running direction of the moving body (referred to hereafter as a relative angle); a transversal-position inferring means for calculating the transversal-direction component of the distance from the moving body to the object of attention from the relative angle measured by the attention-object detecting means; a speed detecting means for measuring the speed of the moving body; and a collision-avoidance control means which is used for decelerating the moving body if: the relative speed measured by the attention-object detecting means is negative; the absolute value of the relative speed is greater than the absolute value of the speed of the moving body measured by the speed detecting means; the transversal-direction component of the distance calculated by the transversal-position inferring means is equal to or smaller than a predetermined value; and the distance from the moving body to the object of attention measured by the attention-object detecting means is equal to or smaller than a specially determined value.

It is desirable to let the collision-avoidance control means described above selectively use either an engine brake or the brake in dependence upon the magnitude of the distance from the moving body to the object of attention measured by the attention-object detecting means.

It is even more desirable to provide the intelligent cruise control system for a moving body according to the fourth aspect of the present invention with a reporting means which is used for reporting that the object of attention is approaching the moving body if: the relative speed measured by the attention-object detecting means is negative; the absolute value of the relative speed is greater than the absolute value of the speed of the moving body measured by the speed detecting means; the transversal-direction component of the distance calculated by the transversal-position inferring means is equal to or smaller than a predetermined value; and the distance from the moving body to the object of attention measured by the attention-object detecting means is equal to or smaller than a specially determined value.

Next, the operations of the intelligent cruise control systems described above are explained.

The explanation begins with description of the intelligent cruise control system according to the first aspect of the present invention.

The distance detecting means is used for measuring the distance from the moving body to an object of attention. The braking-distance estimating means is used for estimating an estimated braking distance along which the vehicle decelerates to a specially set deceleration target speed. The deceleration means is used for comparing the estimated braking distance with a distance measured by the distance detecting means and for decelerating the vehicle if the outcome of the comparison indicates that the estimated braking distance is longer than the distance measured by the distance detecting means.

If a constant-speed running means for letting the moving body run at a specially set target speed is provided, a target-speed changing means is also desired to compare the estimated braking distance with a distance measured by the distance detecting means and reduce the target speed if the outcome of the comparison indicates that the estimated braking distance is longer than the distance measured by the distance detecting means.

Below is a description of the intelligent cruise control system according to the second aspect of the present invention.

The distance detecting means is used for measuring the distance from the cruise control system to an object of attention. The relative-speed detecting means is used for finding the speed of the object of attention relative to the moving body. The time-to-collision estimating means is used for estimating a time before the moving body comes into a rear-end collision with the object of attention from the relative speed found by the relative-speed detecting means and the distance measured by the distance detecting means. The braking-time estimating means is used for estimating an estimated braking time it takes to decelerate the vehicle to a specially set deceleration target speed. The deceleration means is used for comparing the estimated braking time with a time measured by the distance detecting means and for decelerating the vehicle if the outcome of the comparison indicates that the estimated braking time is longer than the time measured by the distance detecting means.

In the case of an intelligent cruise control system provided with a constant-speed running means for letting the moving body run at a specially set target speed, a target-speed changing means is also desired to compare the estimated braking time with a time to rear-end collision estimated by the time-to-collision estimating means and reduce the target speed if the outcome of the comparison indicates that the estimated braking time is longer than the time to rear-end collision estimated by the time-to-collision estimating means.

In the case of intelligent cruise control systems according to the first and second aspects of the present invention provided with a minimum-monitored-speed determining means, the minimum-monitored-speed determining means is used for selecting a speed representing a lowest speed range as a minimum monitored speed among speed ranges each with a speed-occurrence count equal to or greater than a predetermined threshold value with the speed-occurrence count obtained as a result of monitoring carried out by the speed monitoring means during a specially determined period of time. On the other hand, the deceleration-target-speed determining means is used for determining the deceleration target speed based on the minimum monitored speed. Typically, the deceleration-target-speed determining means uses the minimum monitored speed as the deceleration target speed as it is.

Next, the intelligent cruise control system according to the third aspect of the present invention is explained.

The speed monitoring means is used for measuring the speed of the moving body or an object of attention. The monitored-speed determining means is used for selecting a speed representing a highest speed range as a monitored speed among speed ranges each with a speed-occurrence count equal to or greater than a predetermined threshold value with the speed-occurrence count obtained as a result of monitoring carried out by the speed monitoring means during a specially determined period of time. The target-speed determining means is used for determining the target speed based on the monitored speed. Typically, the target-speed determining means uses the monitored speed as the target speed as it is. The constant-speed running means is used for letting the moving body run by maintaining the speed thereof at the determined target speed.

In the case of intelligent cruise control systems according to the first, second and third aspects of the present invention provided with a distance adjusting means, the distance adjusting means holds distance data representing a relation between the speed of the object of attention or the moving body and the distance from the moving body to the object of attention. The distance adjusting means is used for adjusting the speed of the moving body so as to maintain the distance from the moving body to the object of attention at a value defined by the distance data. The operation means, typically an accelerator pedal and a brake pedal, are operated by the driver to issue a command requesting car-speed adjustment. The distance-data updating means is used for updating the distance data by shortening the distance from the moving body to the object of attention associated with a current speed of the object of attention or the moving body as requested by a command for increasing the speed of the moving body issued as a result of operating the operation means, and for updating the distance data by conversely lengthening the distance from the moving body to the object of attention associated with a current speed of the object of attention or the moving body as requested by a command for decreasing the speed of the moving body issued as a result of operating the operation means.

In the case of an intelligent cruise control system provided with a relative-speed control means for adjusting the speed of the moving body by modifying specially determined control gains so as to decrease the relative speed of the moving body with respect to the object of attention, the gain adjusting means is used for increasing the control gains in accordance with a command for raising the speed of the moving body issued as a result of operating the operation means and, on the other hand, for decreasing the control gains in accordance with a command for reducing the speed of the moving body issued as a result of operating the operation means.

In the case of an intelligent cruise control system with the deceleration means thereof comprising a brake control means, the brake control means is used for operating the brake at a point in time at which a distance detected by the distance detecting means reaches a distance defined in brake-start-distance data stored in the storage means for storing in advance the brake-start-distance data showing a relation between the speed of the object of attention or the moving body and a distance from the moving body to the object of attention at which an operation of the brake is to be started. On the other hand, the brake-start-distance-data updating means is used for updating the brake-start-distance data in accordance with an operation carried out by the driver so as to adjust the brake-start timing to what is desired by the driver by: lengthening a distance defined in the brake-start-distance data for a current speed of the object of attention or the moving body in a traffic circumstance wherein a distance measured by the distance detecting means is shorter than the distance defined in the brake-start-distance data for the current speed of the object of attention or the moving body in accordance with a command for canceling deceleration of the moving body issued as a result of operating the operation means; and shortening a distance defined in the brake-start-distance data for a current speed of the object of attention or the moving body in a traffic circumstance wherein a distance measured by the distance detecting means is longer than the distance defined in the brake-start-distance data for the current speed of the object of attention or the moving body in accordance with a command for requesting deceleration of the moving body issued as a result of operating the operation means.

The intelligent cruise control system according to the fourth aspect of the present invention is described as follows.

The attention-object detecting means is used for measuring the distance from the moving body to an object of attention, the relative speed of the object of attention with respect to the moving body and an angle formed by a line connecting the moving body to the object of attention and the running direction of the moving body (also referred to hereafter as a relative angle). The transversal-position inferring means is used for calculating the transversal-direction component of the distance from the moving body to the object of attention from the relative angle measured by the attention-object detecting means. The speed detecting means is used for measuring the speed of the moving body. The collision-avoidance control means is used for decelerating the moving body in order to avoid a head-on collision of the moving body with the object of attention if: the relative speed detected by the attention-object detecting means is negative; the absolute value of the relative speed is greater than the absolute value of the speed of the moving body measured by the speed detecting means; the transversal-direction component of the distance calculated by the transversal-position inferring means is equal to or smaller than a predetermined value; and the distance from the moving body to the object of attention measured by the attention-object detecting means is equal to or smaller than a specially determined value.

The collision-avoidance control means selectively uses either an engine brake or the brake in dependence upon the magnitude of the distance from the moving body to the object of attention measured by the attention-object detecting means. In addition, the reporting means is used for reporting that the object of attention is approaching the moving body.

The operations means employed in the intelligent cruise control systems according to the aspects of the present invention can be provided with dedicated switches such as an ICC set/coast switch 9 and an ICC resume/accelerate switch 10 employed in embodiments to be described later.

BRIEF DESCRIPTION OF THE DRAWINGS

Preferred embodiments of the present invention will be described in detail with reference to accompanying figures some of which illustrate the embodiments wherein:

FIG. 1 is a diagram showing an outline of a running-speed adjusting apparatus (or an ICC system) employed in a vehicle as implemented by an embodiment of the present invention;

FIG. 1A is an enlarged view of the vehicle of FIG. 1 showing the apparatus;

FIGS. 7A and 7B illustrates histograms showing the speeds of cars running ahead of the vehicle within a fixed time frame;

DETAILED DESCRIPTION OF THE PREFERRED EMBODIMENTS

Figure 2:
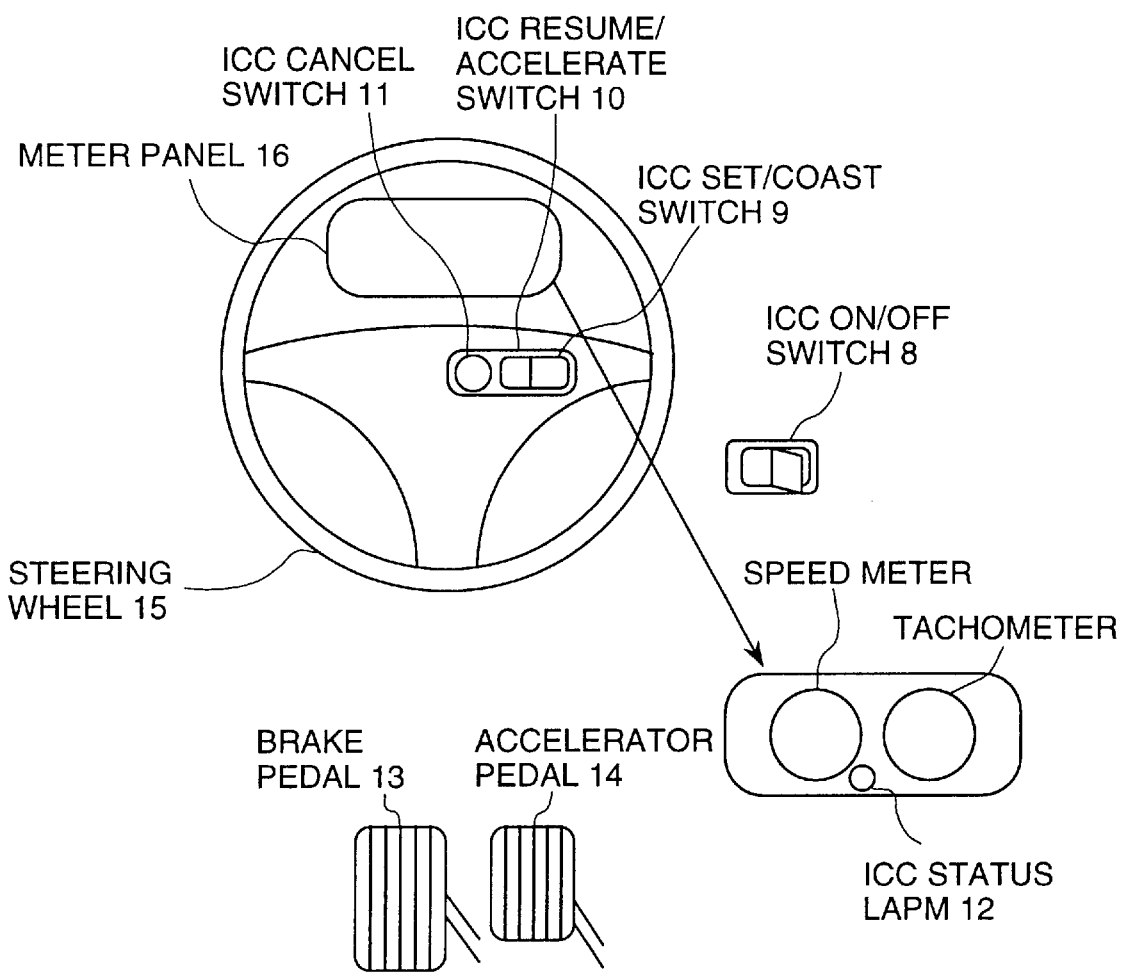
FIG. 2 is a diagram showing typical operation switches employed in the ICC system.

The present invention will become more apparent from a study of the following detailed description of some preferred embodiments with reference to the accompanying diagrams some of which show the embodiments.

FIG. 1 is a diagram showing a typical system configuration of a running-speed adjusting apparatus employed in a vehicle as implemented by an embodiment of the present invention. As shown in the figure, the system comprises main components such as a radar unit 2, a running-speed adjusting unit 3 and an automatic brake unit 4 in addition to a control unit 1 for controlling the conventional engine and the conventional automatic transmission of the vehicle.

The radar unit 2 detects the speed of an object of attention such as a car running ahead of the vehicle relative to the vehicle. On the other hand, the running-speed adjusting unit 3, which is also referred to hereafter as an ICC (Intelligent Cruise Control) unit, adjusts the speed of this vehicle in accordance with information such as the relative speed and the distance from the vehicle to the preceding car. Having a function of the conventional auto cruise control unit for running the vehicle at a constant speed, the running-speed adjusting unit 3 allows acceleration and deceleration to be executed and a vehicle speed or a target speed to be set in accordance with manual operations carried out by the driver on switches of the push-button type. Even though it is not explicitly indicated in the figure, the ICC unit 3 receives signals representing the operating states of an accelerator pedal 14, a brake pedal 13 and a variety of other switches 8, 9, 10 and 11 shown in FIG. 2. In actuality, the ICC unit 3 is implemented by a memory unit 30 for storing various kinds of data and a variety of programs and a microprocessor for executing these programs. Maps and data such as acceleration and deceleration speeds used when following up a preceding car as well as car-to-car distances at a variety of car speeds required in the control to be described later are preset in the memory unit 30 implemented by a RAM or a flash ROM. The memory unit 30 which is not shown in the figure is incorporated inside the ICC unit 3. Details of the maps and these pieces of data will also be described later.

Functioning separately from the operation of the brake pedal carried out by the driver, the automatic brake unit 4 executes a braking function by controlling the hydraulic pressure inside a brake pipe in accordance with a signal 103 output by the ICC unit 3 to represent a target deceleration speed set by the ICC unit 3. The automatic brake unit 4 can be typically implemented by automatically operating a diskbrake driving system using a hydraulic-pressure control sub-system (or an electric motor or the like) of an anti-lock brake system (ABS). It should be noted that the present patent application is not an application concerning the configuration of the automatic brake unit 4 itself. Instead, the essential point of the present invention is-how to automatically adjust the running speed of a vehicle by utilizing the automatic brake unit 4. Thus, the configuration of the automatic brake unit 4 is not described in detail in this specification. In addition, it is needless to say that, when the driver operates the acceleration pedal or the brake pedal, the operation of the acceleration pedal or the brake pedal take precedence over the automatic brake unit 4.

The radar unit 2 measures the distance from the vehicle to a car running ahead of the vehicle or the so-called car-to-car distance and the relative speed of the preceding car by radiating a signal such as an electric wave in the direction of the route and detecting an electric wave reflected by the preceding car. A radar apparatus adopting the FM-CW system using a milli wave band is used as the radar unit 2 in this embodiment. In the FM-CW system, normally, when an electric wave in a giga-hertz band is radiated toward an object of attention serving as a target of measurement, the frequency of the radiated signal is modulated by a modulating signal having a triangular waveform. Since an electric wave reflected by the object of attention is delayed by a time corresponding to the distance from the vehicle to the object of attention and includes a shift component generated by the so-called Doppler effect, it is possible to obtain a beat signal having a frequency equal to the difference in frequency between the originally transmitted and reflected electric waves by mixing the reflected electric wave with the transmitted electric wave. Relations between the frequencies fb1 and fb2 of the beat signal, the distance dr from the vehicle to the object of attention and the relative speed Vr are given by the following equations.

$$dr = (C/(8 \times \Delta F \times Fm)) \times (fb1 + fb2) \quad (1)$$

$$Vr = (C/(4 \times f0)) \times (fb2 - fb1) \quad (2)$$

where C: the velocity of light $\Delta F$: a frequency deviation width

Fm: the modulating-signal frequency f0: the center frequency of the electric wave transmitted by the radar fb1: the frequency of the beat signal detected during a period of an ascending transmission frequency fb2: the frequency of the beat signal detected during a period of a descending transmission frequency The frequency deviation width $\Delta F$ and the frequency Fm of the modulating signal are determined by the detected distance and the distance resolution that the radar unit is supposed to provide. As is obvious from the equations described above, it is possible to measure the distance dr from the vehicle to the object of attention that the radar is trying to catch up with, that is, the car running ahead of the vehicle, or the so-called car-to-car distance, and the relative speed at the same time. In addition, by installing the radar antennas 5 on the right and left ends of the front bumper of the vehicle for example, it is also possible to find an angle formed by the moving-forward direction of the vehicle and a line connecting the vehicle to the object of attention from a difference between the car-to-car distances measured by the two radar antennas 5. Processing to find the relative speed Vr, the car-to-car distance dr and the angle described above is carried out by a radar circuit 6.

In addition to the system of the onboard radar explained above, there is also a radar adopting a technique of using a laser or an infrared light. For example, disclosed in Japanese Patent Laid-open No. Sho 58-27678 is an electric-wave radar apparatus for measuring the relative speed and the car-to-car distance from a Doppler frequency superposed on an electric wave reflected by a car running ahead of a vehicle with a radar installed thereon for radiating an electric wave to the preceding car. In a laser radar apparatus adopting a pulse method disclosed in Japanese patent Laid-open No. Sho 58-203524, when a car is running ahead of a vehicle with a radar installed thereon, a car-to-car-distance signal D is output to represent the car-to-car distance which is found by radiating a laser light to the preceding car and measuring the time it takes for a radar light reflected by the preceding car to arrive back at the radar. At any rate, a radar with any method can be employed as long as the radar is capable of measuring the car-to-car distance and the relative speed.

In the following description, an ICC vehicle means a vehicle with the running operation thereof controlled automatically by the intelligent cruise control system provided by the present invention whereas the ICC system means the system as a whole.

The following is a description of how the ICC system reacts in response to operations carried out by the driver along with an example of operation switches with reference to FIG. 2.

Much like the conventional auto cruise control apparatus, the operation switches are laid out at such locations that the driver can operate them with ease such as locations around the steering wheel.

After starting the engine, the driver initially presses an ICC on/off switch 8 in order to activate the ICC system. When the ICC system is activated, an ICC start lamp 12 is turned on.

On a steering handle 15, an ICC set/coast switch 9 for setting and reducing the speed of the ICC vehicle, an ICC resume/accelerate switch 10 for increasing the speed of the ICC vehicle and an ICC cancel switch 11 for canceling ICC processing are provided.

When the user presses the ICC set/coast switch 9 once, the ICC unit 3 recognizes the operation desired by the user, setting the speed at which the ICC vehicle is running at that time as a target speed. Then, if there is no car running ahead of the ICC vehicle, the ICC unit 3 outputs a target-speed signal 101 to the control unit 1 so that the ICC vehicle continues to run, maintaining its speed at the target speed. When the user further presses the ICC set/coast switch 9 continuously, the ICC unit 3 this time interprets the operation as a command to decelerate the ICC vehicle, decreasing the value of the target-speed signal 101. As a result, the speed of the ICC vehicle is reduced. By the same token, when the user presses the ICC resume/accelerate switch 10 continuously, the ICC unit 3 interprets the operation as a command to accelerate the ICC vehicle, increasing the value of the target-speed signal 101. As a result, the speed of the ICC vehicle is increased. When the driver presses the ICC cancel switch 11, the ICC system is turned off.

Also supplied to ICC unit 3 is operational information such as information on the operating state of the accelerator pedal 14 and the brake pedal 13. When the user operates the accelerator pedal 14 or the brake pedal 13, the ICC unit 3 temporarily cancels outputs of the ICC system, letting the operation carried out by the driver take precedence over the outputs of the ICC system.

The following is a description of an outline of the operation of the ICC system.

When a running ICC vehicle with a radar antenna 5 installed thereon receives an electric wave reflected by a car 50 running ahead of the running ICC vehicle as a result of radiation of an electric wave by the radar antenna 5 to the preceding car, the radar circuit 6 computes the relative speed Vr and the car-to-car distance dr in accordance with the computation formulas described earlier. Results of the computation (that is, the relative speed Vr and the car-to-car distance dr) are transmitted to the ICC unit 3. As a result, when the ICC unit 3 forms a judgment that the ICC vehicle should run to follow up the preceding car while maintaining a certain car-to-car distance, the ICC system gets in a follow-up-cruise mode in which the ICC unit 3 transmits a target-speed signal 101 and a target-acceleration signal 102 to the control unit 1. In accordance with the target-speed signal 101 and the target-acceleration signal 102, the control unit 1 adjusts a variety of control signals such as the control signals for the degree of opening of the throttle, the ignition-signal timing, the fuel-injection timing and the A/T gear position. In this way, the control unit 1 implements running control of the ICC vehicle so that the ICC vehicle is running at a target speed and a target car-to-car distance desired by the ICC system.

In addition, when the car running ahead of the ICC vehicle applies a brake all of a sudden, the car-to-car distance is shortened abruptly. In this case, the ICC unit 3 may form a judgment that deceleration of the vehicle is not enough if only deceleration based on the engine brake is relied on, giving rise to fear of a rear-end collision of the ICC vehicle with the preceding car. In such a case, the ICC system calculates a necessary target deceleration and transmits a brake signal 103 representing the calculated target deceleration to the automatic brake unit 4, requesting the automatic brake unit 4 to output a necessary braking force to a brake actuator.

The essential point of the present invention is the automatic adjustment of quantities such as the running speed through brake control based on information detected by an onboard radar in addition to the conventional control embraced traditionally such as the control of the output of the engine and the shift control of the automatic transmission. To put in detail, when a radar detects the existence of a car running ahead of the ICC vehicle on which the radar is installed, the ICC system gets in a follow-up-cruise mode automatically, letting the ICC vehicle run by maintaining a fixed car-to-car distance from the preceding car. In addition, if the speed of the preceding car is lower than a target speed set at that time, the ICC system lets the vehicle runs at the same speed as the preceding car, that is, at a relative speed of zero. If the preceding car starts acceleration, the speed of the ICC vehicle is adjusted automatically so as to follow the accelerating car as long as the speed of the preceding car is lower than the target speed set at that time.

In addition, the present invention is aimed at implementation of control giving a lesser sense of incompatibility to the driver by letting the ICC system provided by the present invention learn operations carried out by the driver and make use of the learned results. In order to learn the driver's operations, the ICC system monitors operations carried out by the driver and stores data resulting from the monitoring into a memory. Then, by making use of the data, control resulting in an operation close to the driving sense of the driver can be implemented.

The ICC system provided by the present invention also executes control to avoid a head-on collision of the ICC vehicle with an oppositely traveling car.

In order to achieve such control, technical challenges that are faced are listed as follows:

(1) Infer values of control parameters relevant to a running state from information detected by the radar.
(2) Learn driving characteristics which vary from driver to driver and infer values of the control parameters from data resulting from the learning process.
(3) Carry out automatic running control based on the learned values of the control parameters, in particular, brake control in the case of the present invention.

The technical challenges described above are each described in detail as follows.

First of all, control of the car-to-car distance based on the brake control is explained in detail below.

To maintain a constant car-to-car distance is equivalent to control to make the speed of a car running ahead of an ICC vehicle relative to the ICC vehicle zero. By adopting a configuration like the one shown in FIG. 3, car follow-up control to maintain the car-to-car distance at a constant value can be carried out.

By feeding back the car-to-car distance dr from the ICC vehicle to the preceding car and the relative speed Vr of the preceding car with respect to the ICC vehicle which are measured by the radar, it is possible to perform control so as to make the measured car-to-car distance dr equal to a target car-to-car distance D0 and to make the relative speed Vr equal to zero. The target car-to-car distance D0 is obtained by mapping the speed of the vehicle Vs onto a car-to-car distance D0 using map information stored in the memory. The car-to-car distance D0 resulting from the mapping of the speed of the vehicle Vs at that time is read out from the map stored in the memory as a target value.

The figure shows a control system loop for the car-to-car distance and a control system loop for the relative speed connected to each other in parallel. Both the control system loops are implemented as a PD (Proportional Differential) control system. A proportional (P) gain kdp and a differential (D) gain kdd of the car-to-car distance and a proportional (P) gain kvrp and a differential (D) gain kvrd of the relative speed are each initially set at a predetermined (fixed) value. The operations of the two control system loops determine the values of commands issued to the engine control system. The engine-output control based on the values of the commands then determines the speed of the vehicle Vs.

The accuracy of the follow-up distance with respect to the target car-to-car distance, the accuracy of the relative speed and the stability of the follow-up control are determined by the magnitudes of the gains. When the car running ahead of the ICC vehicle accelerates, resulting in a positive relative speed (Vr>0), for example, the value of the relative speed is fed back to the control system loops, causing follow-up acceleration to be started as a response which is prescribed by the gains kvrp and kvrd. Since the car-to-car distance increases after the preceding car accelerates, the response of the control system of the car-to-car distance lags behind that of the control system of the relative speed. If the gains kvrp and kvrd of the control system of the relative speed are set at large values, the ICC system responds to a change in speed happening to the preceding car with a high degree of sensitivity. In this case, the movement of the ICC vehicle is completely governed by changes in speed, that is, acceleration and deceleration, occurring in the preceding car. This control is known as follow-up-response precedence control. If the gains kvrp and kvrd of the control system of the relative speed are set at small values, on the other hand, the ICC system responds to a change in speed, that is, acceleration and deceleration, occurring in the preceding car slowly. In this case, the ICC vehicle moves in such a way that the speed thereof does not change much, that is, the ICC system lets the ICC vehicle run at a speed as constant as possible. Such control is referred to as constant-speed precedence control.

Whether the follow-up-response precedence control or the constant-speed precedence control slightly sacrificing the follow-up characteristic is adopted is a matter of choice which varies considerably from driver to driver due to differences in preference among the individuals. Setting the gains initially at fixed values may cause the driver to feel dissatisfaction and anxiety.

In order to implement smooth automatic driving, control of deceleration is more important than control of acceleration. This is because, in a normal cruise, a car running ahead of an ICC vehicle is a car having nothing to do with the ICC vehicle so that it is impossible to know what running pattern the preceding car will exhibit. In particular, when the preceding car suddenly applies a brake, the ICC vehicle will temporarily approach the car all of a sudden. For this reason, it is necessary to always estimate the possibility of a sudden approach of the ICC vehicle toward the preceding car due to an abrupt deceleration of the car in the course of running and to always maintain a required car-to-car distance so as to avoid a rear-end collision of the ICC vehicle with the preceding car.

A car-to-car distance required for avoiding a rearend collision of the ICC vehicle with the preceding car can be calculated from the braking force of the automatic brake unit. That is to say, a car-to-car distance necessary for avoiding a rear-end collision can be prescribed by using an amount of possible deceleration from the present speed of the ICC vehicle.

An estimated braking time, a time estimated to be required to decelerate a vehicle currently running at a speed Vs to a speed V0, is expressed by Eq. 3 as follows:

$$Tr=(Vs-V0)/\alpha rmax \qquad (3)$$

where notation αrmax is a maximum deceleration of the automatic brake unit. It should be noted that a deceleration is treated as a negative acceleration. A distance Dr along which the vehicle runs at a deceleration from the present speed Vs to the reduced speed V0, that is, a distance estimated to be required for the braking operation (referred to as an estimated braking distance), is expressed by Eq. 4 as follows:

$$Dr=(Vs^2-V0^2)/(2\times\alpha rmax) \qquad (4)$$

where notation αrmax is a maximum deceleration of the automatic brake unit which is treated as a negative acceleration as described above. Therefore, by maintaining the distance between the ICC vehicle and the preceding car at a value greater than the estimated braking distance Dr, a rear-end collision of the ICC vehicle with the preceding car can thus be avoided. As is obvious from Eqs. 3 and 4, however, the values of the estimated braking time Tr and the estimated braking distance Dr much depend on what value the reduced speed V0 is set at. If the estimated braking distance Dr is treated as a distance along which the ICC vehicle runs before coming into a stop from the present speed Vs, that is, if the estimated braking distance Dr is calculated by substituting zero for the decelerated speed V0, a value of the estimated braking distance Dr much greater than a car-to-car distance normally taken will be obtained, making it impossible to put the ICC system to practical use.

For the reason described above, in the present invention, the speed V0 used in Eq. 3 is set at a value equal to the minimum traveling speed of the car running ahead of the ICC vehicle. The estimated braking distance Dr is then calculated from Eq. 4 by substituting the value set in Eq. 3 for the speed V0. The estimated braking distance Dr is then used for controlling the running of the ICC vehicle so that the ICC vehicle does not approach the preceding car at a distance shorter than the estimated braking distance Dr.

The maximum deceleration αrmax of the automatic brake system can be found from a theory of the braking performance of the automatic brake system. Details of the braking performance of a brake system are described in references such as 'Automobile Engineering Handbook', Chapter 4 Fundamentals and Theory of Braking Performance.

According to this reference, relations between the maximum deceleration αrmax of the automatic brake system and maximum braking forces Bfmax and Brmax that can be generated by the tires of a vehicle are expressed by Eqs. 5 as follows:

$$Bfmax=\alpha rmax/g(Wf+MC\times\alpha rmax/g\times h/1)$$

$$Brmax=\alpha rmax/g(Wr-MC\times\alpha rmax/g\times h/1)$$

$$Bfmax+Brmax=\alpha rmax/g(Wf+Wr) \qquad (5)$$

where Mc: the total weight of the vehicle
Wf: the static load of the front wheels of the vehicle
Wr: the static load of the rear wheels of the vehicle
l: the wheel base of the vehicle
h: the center of gravity of the vehicle
g: the acceleration of free fall
Bfmax: the maximum braking force of the front wheels in an ideal state
Brmax: the maximum braking force of the rear wheels in an ideal state The total weight Mc, the static load of the front wheels Wf, the static load of the rear wheels Wr, the wheel base 1 and the center of gravity h are determined by the geometry of the vehicle whereas the maximum braking force of the front wheels Bfmax and the maximum braking force of the rear wheels Brmax are prescribed in the specifications of the brake. Thus, the maximum deceleration αrmax can be expressed by Eq. 6 as follows:

$$\alpha rmax=(Bfmax+Brmax)g/(Wf+Wr) \qquad (6)$$

By the way, the maximum braking force of the front wheels Bfmax and the maximum braking force of the rear wheels Brmax are expressed by Eqs. 7 as follows:

$$Bfmax=\mu(Wf+Mc\times\alpha rmax/g\times H/1) \; Brmax=\mu(Wr-Mc\times\alpha rmax/g\times H/1) \qquad (7)$$

where notation μ denotes the coefficient of friction between the tires and the surface of the road.

Thus, for αrmax/g>μ, the maximum deceleration αrmax can be calculated by substituting Eq. 7 to Eq. 6. In the case of a rain or a similar road condition, the value of the coefficient of friction μ is small. In such a case, the deceleration that can be generated is limited to α=μg. It is thus a matter of course that the estimated braking distance in such a condition is longer than the estimated braking distance in a normal condition. In an anti-lock braking system (ABS), a lock state of a wheel is detected by monitoring rotation pulses generated by a wheel-speed sensor as is used generally in order to control the braking force of the brake. A judgment as to whether or not a wheel is locked is formed from the angular speed w of the wheel which is calculated from the rotation pulses generated by the wheel-speed sensor. To be more specific, a judgment determining that a wheel is locked is formed when the angular speed ω of the wheel decreases or becomes zero all of a sudden. Under such a condition, it is desirable to set the car-to-car distance at a value greater than the estimated braking distance.

From the consideration described above, there are two possible control methods that can be adopted by the automatic brake unit 4 as explained below.

The first control method comprises the steps of: finding the estimated braking distance Dr, a distance along which the ICC vehicle runs at deceleration by the automatic brake unit to a certain speed; and operating the automatic brake unit immediately and adjusting the car-to-car distance by reducing the set target speed if the estimated braking distance Dr is longer than the current car-to-car distance.

The second control method, which is implemented if the detected relative speed has a negative value, that is, if the ICC vehicle is approaching a car running ahead of the ICC vehicle, comprises the steps of: finding a collision time, a time to a rear-end collision of the ICC vehicle with the preceding car; comparing the collision time with a braking time, a time it takes to decelerate to a certain speed by means of the automatic brake unit; and operating the automatic brake unit immediately and adjusting the car-to-car distance by reducing the set target speed if the braking time is found longer than the collision time.

Figure 4:
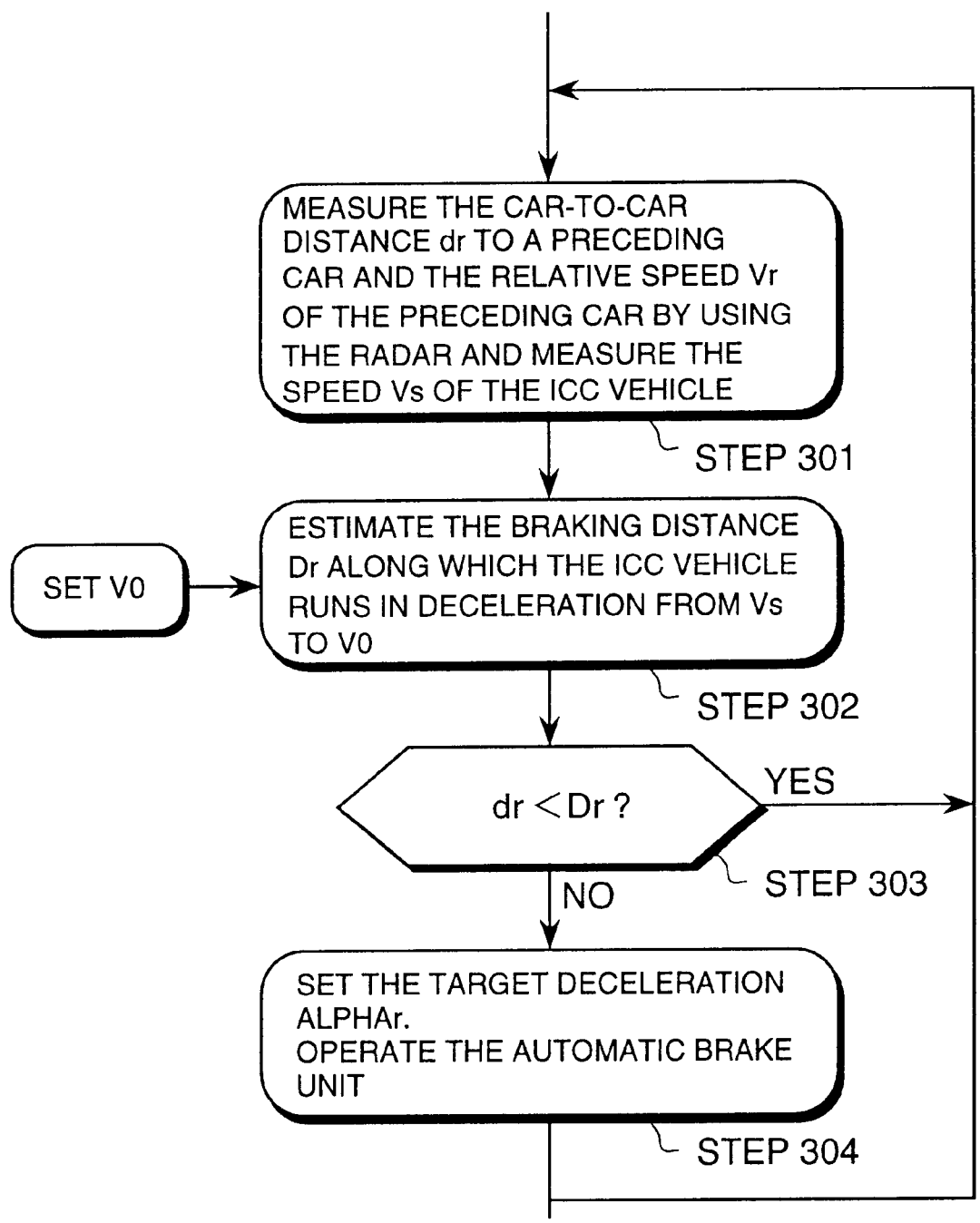
FIG. 4 is a schematic flow diagram showing a control method of an automatic brake unit 4 employed in the ICC system.

The control of the automatic brake unit 4 adopting the first control method, one of the two control methods which is based on the car-to-car distance, is explained by referring to a flowchart shown in FIG. 4 as follows.

As shown in the figure, the flowchart begins with a step 301 at which, as the radar unit 2 detects the existence of a car running ahead of the ICC vehicle, the radar unit 2 finds a relative speed Vr of the preceding car with respect to the ICC vehicle as well as a current distance dr from the ICC vehicle to the preceding car and outputs the relative speed Vr and the distance dr to the ICC unit 3. Also at the step 301, the ICC unit 3 finds a current running speed Vs of the ICC vehicle in addition to the relative speed Vr received from the radar unit 2. The flow of the control procedure then goes on to a step 302 at which the ICC unit 3 finds the estimated braking distance Dr, a distance along which the ICC vehicle runs at a deceleration from the current speed Vs to a specially set speed V0 by using Eq. 4 given earlier. As the speed V0 used in the calculation of the estimated braking distance based on Eq. 4, a minimum monitored speed Vmin to be described later can be taken. Refer to a step 406 of a flowchart shown in FIG. 6. As an alternative, a small value obtained by subtracting a $\Delta V$ (km/h) from the current speed Vs can also be indiscriminately used as the speed V0. As another alternative, the speed V0 can also be set a value which is determined from another point of view. It should be noted that the maximum deceleration $\alpha$rmax is found by using Eq. 6 given above.

The flow of the control procedure then proceeds to a step 303 at which the ICC unit 3 compares the estimated braking distance Dr found at the step 302 with the current car-to-car distance dr received from the radar unit 2 at the step 301. If the outcome of the comparison indicates that the estimated braking distance Dr is shorter than the current car-to-car distance dr (dr>Dr), the ICC unit 3 forms a judgment that the current car-to-car distance dr is long enough for avoiding a rear-end collision of the ICC vehicle with the preceding car. In this case, the flow of the control procedure returns to the step 301. If the outcome of the comparison indicates that the estimated braking distance Dr is longer than the current car-to-car distance dr (dr<Dr), on the other hand, the ICC unit 3 forms a judgment that the current car-to-car distance dr is not long enough for avoiding a rear-end collision of the ICC vehicle with the preceding car, that is, it is quite within the bounds of possibility that a rear-end collision of the ICC vehicle with the preceding car would occur. In this case, the flow of the control procedure continues to a step 304. At the step 304, the ICC unit 3 sets a target deceleration ar and transmits a command signal to the automatic brake unit 4 to request the automatic brake unit 4 that a brake be applied. At the same time, the value at which the target speed of the constant-speed running control is set is reduced. The way in which the target deceleration $\alpha$r is set is not prescribed in particular. Basically, however, the target deceleration $\alpha$r is set at a value depending upon the current car-to-car distance dr and the relative speed Vr. Qualitatively speaking, it is desirable to set the target deceleration ar at a value which varies in such a way that, the shorter the current car-to-car distance dr, the greater the value for the target deceleration $\alpha$r. It is also desirable to set the target deceleration $\alpha$r at a value which varies in such a way that, the higher the relative speed Vr, the greater the value for the target deceleration $\alpha$r Pieces of processing at the steps 301 to 304 are carried out for each sampling of the car-to-car distance dr and other information by the radar unit 2. Thus, even if the automatic brake unit 4 is operated at the step 304, calculation based on a later sampling may results in dr>Dr in which case the operation of the automatic brake unit 4 is discontinued at that time.

Figure 5:
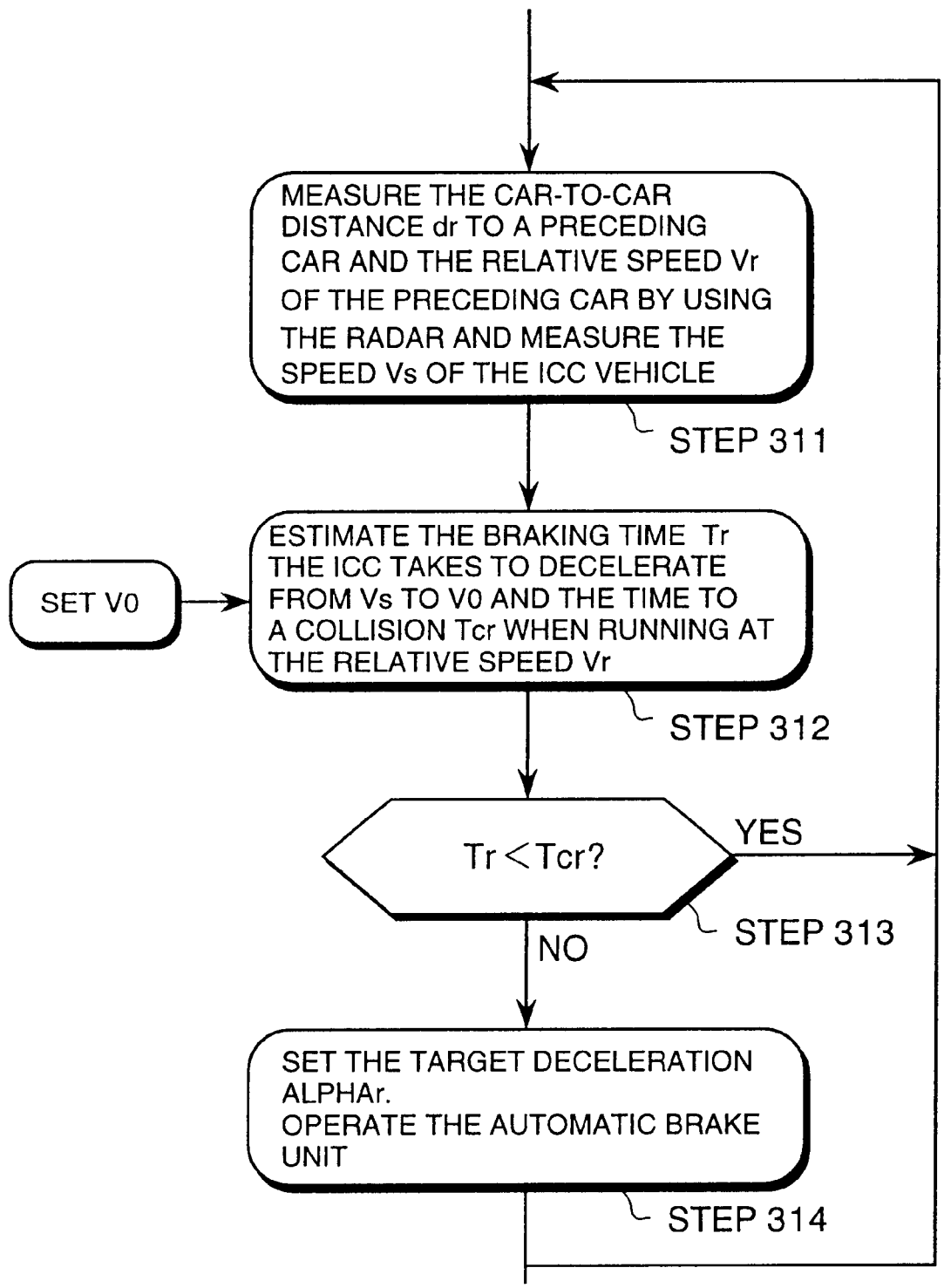
FIG. 5 is another schematic flow diagram showing a control method of an automatic brake unit 4 employed in the ICC system.

Next, the control of the automatic brake unit 4 adopting the second control method, a control method based on the relative speed, is explained by referring to a flowchart shown in FIG. 5.

As shown in the figure, the flowchart begins with a step 311 at which, as the radar unit 2 detects the existence of a car running ahead of the ICC vehicle, the radar unit 2 finds the relative speed Vr of the preceding car with respect to the ICC vehicle as well as the current distance dr from the ICC vehicle to the preceding car and outputs the relative speed Vr and the distance dr to the ICC unit 3. Also at the step 311, the ICC unit 3 finds a current running speed Vs of the ICC vehicle in addition to the relative speed Vr received from the radar unit 2.

The flow of the control procedure then goes on to a step 312 at which the ICC unit 3 finds a time to collision Tcr (=dr/Vr), a time the ICC vehicle takes to come into a rear-end collision with the preceding car if the ICC vehicle keeps approaching the preceding car at the relative speed Vr and an estimated braking time Tr. The estimated braking time Tr is calculated by using Eq. 3 given earlier. As the speed V0 used in the calculation of the estimated braking distance based on Eq. 4, a minimum monitored speed Vmin to be described later can be taken. Refer to the step 406 of the flowchart shown in FIG. 6. As an alternative, a small value obtained by subtracting a $\Delta V$ (km/h) from the current speed Vs can also be indiscriminately used as the speed V0. As another alternative, the speed V0 can also be set a value which is determined from another point of view. It should be noted that the maximum deceleration $\alpha$rmax is found by using Eq. 6 given above.

The flow of the control procedure then proceeds to a step 313 at which the ICC unit 3 compares the estimated braking time Tr with the current time to collision Tcr found at the step 312. If the outcome of the comparison indicates that the estimated braking time Tr is shorter than the current time to collision Tcr (Tcr>Tr), the ICC unit 3 forms a judgment that the current car-to-car distance dr is long enough for avoiding a rear-end collision of the ICC vehicle with the preceding car. In this case, the flow of the control procedure returns to the step 311. If the outcome of the comparison indicates that the estimated braking time Tr is longer than the current time to collision Tcr (Tcr<Tr), on the other hand, the ICC unit 3 forms a judgment that the current car-to-car distance dr is not long enough for avoiding a rear-end collision of the ICC vehicle with the preceding car, that is, it is quite within the bounds of possibility that a rear-end collision of the ICC vehicle with the preceding car would occur. In this case, the flow of the control procedure continues to a step 314. At the step 314, the ICC unit 3 sets a target deceleration ar and transmits a command signal to the automatic brake unit 4 to request the automatic brake unit 4 that a brake be applied. At the same time, the value at which the target speed of the constant-speed running control is reduced. The way in which the target deceleration $\alpha$r is set is not prescribed in particular. Basically, however, the target deceleration $\alpha$r is set at a value depending upon the current car-to-car distance dr, the relative speed Vr and the estimated braking time Tr. Qualitatively speaking, it is desirable to set the target deceleration αr at a value that varies in such a way that, the shorter the current car-to-car distance dr, the greater the value for the target deceleration αr. It is also desirable to set the target deceleration αr at a value that varies in such a way that, for a negative relative speed Vr, the greater the absolute value of the relative speed Vr, the greater the value for the target deceleration αr. It is still further desirable to set the target deceleration αr at a value that varies in such a way that, the longer the estimated braking time Tr, the greater the value for the target deceleration αr Pieces of processing at the steps 311 to 314 are carried out for each sampling of the car-to-car distance dr and other information by the radar unit 2. Thus, even if the automatic brake unit is applied at the step 314, calculation based on a later sampling may results in Tcr>Tr in which case the operation of the automatic brake unit 4 is discontinued at that time.

As described above, by combining the control of the engine/automatic transmission with the control of the automatic braking, it is possible to carry out control of the car-to-car distance whereby a car-to-car distance long enough for avoiding a rear-end collision of an ICC vehicle with a car running ahead of the ICC vehicle is kept all the time.

The following is a description of how to set and adjust a variety of conditions required for making the ICC system more effective and the reasons why the conditions are set in those ways. The conditions include the target speed, the car-to-car distance, the follow-up characteristic and an auto-brake start point. As will be obvious from the following description, according to the present invention, these conditions are not set at fixed values predetermined in advance. Instead, optimum values are each found through a learning process.

[1] Setting of the Target Speed

In the case of the conventional ICC system, a speed used as a target in speed adjusting control (which is also referred to as target speed) is set by the driver arbitrarily. A person who has driving experience will know that there is a speed band known as the so-called flow of traffic representing an average speed level of the traffic on an individual road as experienced by the person. A well trained good driver drives a car smoothly by grasping the flow of traffic using the driver's faculty of sensation. That is to say, such a driver efficiently drives a car with few changes in acceleration and deceleration by suppressing the number of times the brake is applied.

However, such driving is based on ambiguous information which is derived from the feeling of the driver itself and, thus, difficult to express in terms of numbers. Thus, even a good driver may not necessarily be able to set a target speed of the ICC system in an optimum manner in some cases. If the target speed set at that time does not match the flow of traffic, smooth driving can not be carried out. If the set target speed is very high in comparison with an average speed on a road, for example, acceleration as well as deceleration will be repeated frequently. To put it in detail, the ICC vehicle will be about to come into an imminent rear-end collision with the car running ahead of the vehicle from time to time due to an excessively high target speed. At that time, the ICC vehicle is decelerated by the ICC system. When the preceding car changes the running lane thereof, disappearing from the angle of view of the radar, however, the ICC vehicle is accelerated again. As the ICC vehicle is about to come into an imminent rear-end collision with another car running ahead of the vehicle, another deceleration occurs. In this way, this state of acceleration and deceleration continues. Not only does such frequent repetition of acceleration and deceleration cause the passengers to feel uncomfortable, but the fuel consumption of the vehicle is also worsened, possibly giving rise to an undesirable situation. If the set target speed is very low in comparison with an average speed on a road, on the other hand, the flow of traffic will be disturbed. An unreasonably large number of cars running behind the ICC vehicle will pass the vehicle, adversely giving rise to a dangerous situation. To put it in detail, as the distance from the ICC vehicle to a car running ahead of the vehicle is becoming larger and larger, cars running behind the ICC vehicle pass the vehicle one after another. The passing car makes an interrupt by getting in the path between the ICC vehicle and a car running ahead of the vehicle.

Essential to the flow of traffic is for an ICC vehicle to run at a speed matching the traffic flow. For this reason, in addition to the maximum deceleration αrmax of the auto brake system, a target speed and a minimum running speed set from the matching-the-traffic-flow point of view are required by the ICC system. A speed representing the flow of traffic, also referred to hereafter as a monitored speed, is inferred by the ICC system. The monitored speed inferred from time to time can be used as a target speed of the ICC speed control system. In addition, a minimum running speed in a flow of traffic obtained during particular period of time is also inferred as well. Such a minimum running speed is referred to hereafter as a minimum monitored speed Vmin cited earlier. By using the minimum monitored speed Vmin as a speed V0 that will result at the end of a braking operation at the steps 302 and 312 of the flowcharts shown in FIGS. 4 and 5 respectively, it is possible to implement automatic brake control giving rise to no fear of collisions.

Therefore, according to the present invention, the traveling speed of a car running ahead of an ICC vehicle is monitored during a fixed period of time in order to determine the monitored speed and the minimum monitored speed Vmin. The following is detailed description of how to learn and set the monitored speed and the minimum monitored speed Vmin with reference to a flowchart shown in FIG. 6 and histograms shown in FIG. 7.

Figure 6:
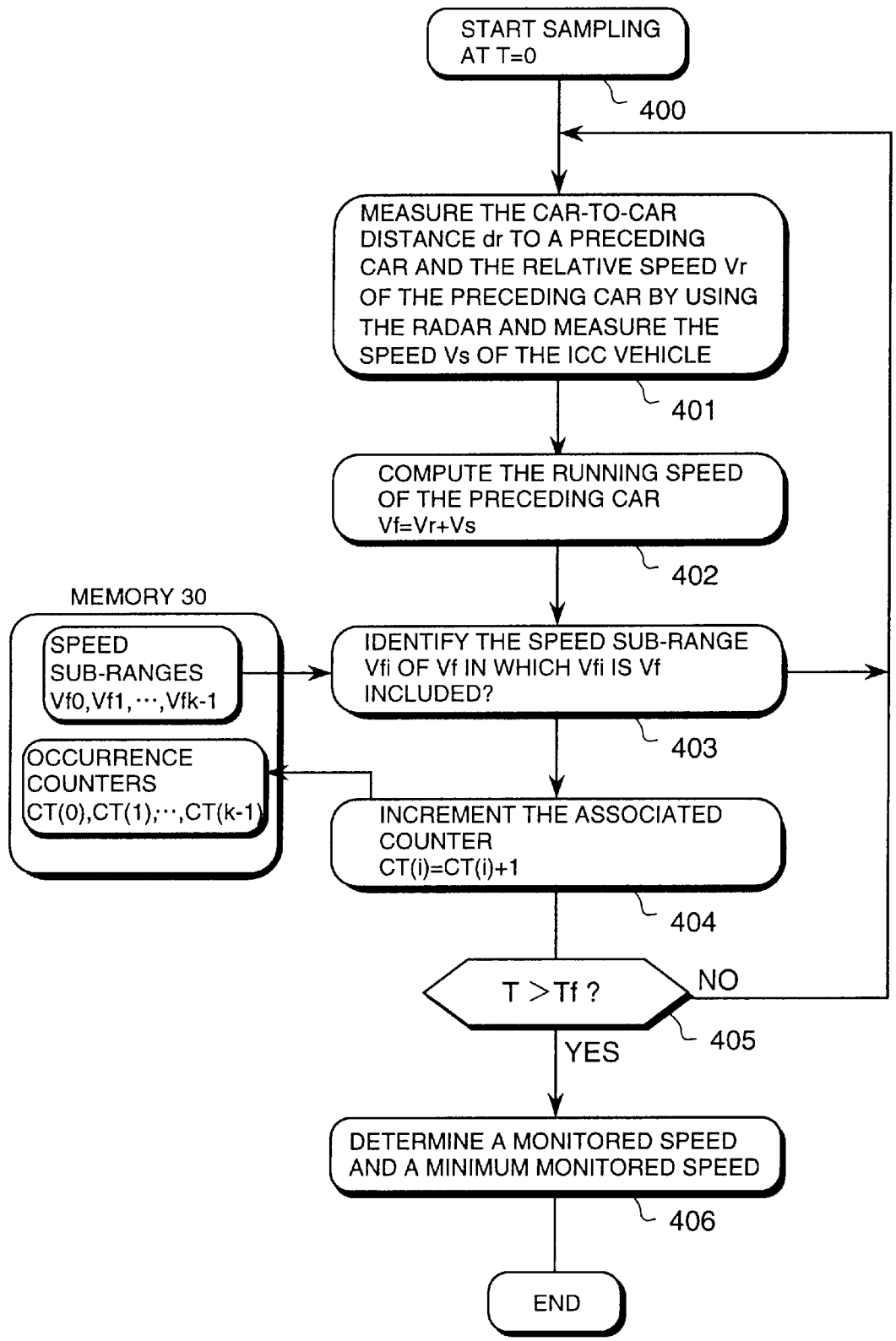
FIG. 6 is a schematic flow diagram showing a method for inferring information on a traffic flow from the speed of a car running ahead of the vehicle.

When the ICC unit 3 is activated in the course of driving the ICC vehicle, a learning process is started automatically. As shown in FIG. 6, the flowchart begins with a step 400 at which sampling of measurement quantities and measurement of the lapse of time are started at the same time. Pieces of processing carried out at subsequent steps 401 to 405 are repeated till a time Tf lapses since a start time at which the measurement of the lapse of time is commenced, allowing the traveling speed of a car running ahead of the ICC vehicle to be monitored continuously.

To put it in detail, at the step 401, the ICC unit 3 lets the radar unit 2 measure the relative speed Vr of a car running ahead of the ICC vehicle with respect to the vehicle. In addition to the relative speed Vr, the ICC unit 3 also measures the speed Vs of the ICC vehicle. The flow of the learning process then goes on to the step 402 at which the speed Vf of the preceding car is calculated as a sum of the relative speed Vr and the speed Vs measured at the step 401 (Vf=Vr+Vs).

The ICC unit 3 divides a range of the traveling speed at which a preceding car can run into k speed sub-ranges [Vf0, Vf1, - - - , Vfk−1] set in advance. The speed sub-ranges adjacent to each other in the speed range each has a fixed width. The speed sub-ranges are each provided with an occurrence counter CT (n), where n=0 to k−1, for counting the number of times the measured value of the speed Vf of the preceding car falls into the speed sub-range. At the step 403 following the step 402, the ICC unit 3 forms a judgment as to which of the k speed sub-ranges [Vf0, Vf1, - - - , Vfk−1] a measured value of the speed Vf pertains to. The flow of the learning process then proceeds to a step 404 at which the value of the occurrence counter assigned to the speed sub-range is incremented. The contents of the occurrence counters CT(0), CT(1), - - - CT(k−1) assigned to the speed sub-ranges [Vf0, Vf1, - - - , Vfk−1] respectively are all stored in the memory unit 30. For example, if the measured value of the running speed Vf of the preceding car is in the sub-range Vfi, the value of the occurrence counter CT(i) assigned to the speed sub-range Vfi is incremented by one.

The flow of the learning process then goes on to a step 405 at which the ICC unit 3 forms a judgment as to whether the time Tf determined in advance has lapsed since the start of the sampling operation. If the predetermined time Tf has not lapsed, the flow returns to the step 401 to repeat the pieces of processing described above. If the predetermined time Tf has lapsed, on the other hand, the flow continues to a step 406.

As a result of the learning process done so far, that is, as a result of sampling the speed Vf of the preceding car and counting the number of times a speed Vf included in each speed sub-range Vfi is detected, the ICC unit 3 generates an internal histogram like the one shown in FIG. 7. The histogram shows an occurrence count for each speed sub-range Vfi composing the range of the traveling speed at which a preceding car can run, that is, the number of times the value of the speed Vf pertaining to the speed sub-range Vfi is detected. At the step 406, the ICC unit 3 determines the monitored speed and the minimum monitored speed from the histogram. The monitored speed is a representative value showing the greatest occurrence count in the histogram. That is to say, the peak speed Vfi1 with the greatest occurrence count is taken as the monitored speed. A representative value of a sub-range of lowest speeds with an occurrence count greater than a threshold count set in advance is used as the minimum monitored speed Vmin. In the histogram, the value Vfmin of the lowest-speed sub-range is thus taken as the minimum monitored speed Vmin. The threshold count is usually set at a fraction of the number of samples. A typical value of the fraction is 5%. Thus, if the number of samples taken during the period of time between points of time 0 and Tf is 3000, for example, the threshold line is set at 150 (=5%×3000). The monitored speeds inferred in this way can be considered to be speeds closest to the flow of traffic during this particular period of time.

By the way, the flow of traffic varies in dependence upon a road on which the ICC vehicle is running. Even the flow of traffic of the same road varies from time period to time period. For these reasons, the learning process shown in FIG. 6 is repeated from time to time in the course of ICC-vehicle running.

A time Tr it takes to complete the learning process for the first time is determined in advance. Times Tr it takes to complete the learning process for the second and subsequent times, that is, times it takes to update the monitored speeds, are modified in dependence upon the running condition prevailing at that time as follows. When the speed varies much frequently, that is, when the ICC vehicle is running on a city road, for example, the monitored speeds should be updated in a relatively short period of time. When the speed varies only moderately, that is, when the ICC vehicle is running on a highway, on the other hand, the monitored speeds can be updated at long intervals. The difference between the two running conditions can be clearly seen from the histograms of FIGS. 7A and 7B. In a histogram which is obtained while the ICC vehicle is running on a city road (FIG. 7A), the speed band is spread over a wide zone. In a histogram which is obtained while the ICC vehicle is running on a highway (FIG. 7B), on the other hand, the speed band is concentrated on a narrow zone. Thus, an update time interval can be prepared in advance for each histogram pattern. That is to say, a time to carry out a next updating operation is set in accordance with the pattern of a previous histogram. It should be noted, however, that the way to set and update the time Tr described above is not intended to be construed in a limiting sense. That is to say, the way in which the time Tr is set and updated is not limited to what is described above.

The flow of traffic can also be grasped as well by monitoring the speed of the ICC vehicle.

By the same token, the way to set or define the monitored speeds described above is also not intended to be interpreted in a limiting sense. That is to say, the way in which the time Tr is set and updated is not limited to the above description. For example, it is possible to adopt a method whereby an average of all sample values is used as a monitored speed. As an alternative, there is also a conceivable technique whereby, each time a sample value greater than a threshold is obtained, an average of such values is calculated and the average is used as a monitored speed.

Figure 8:
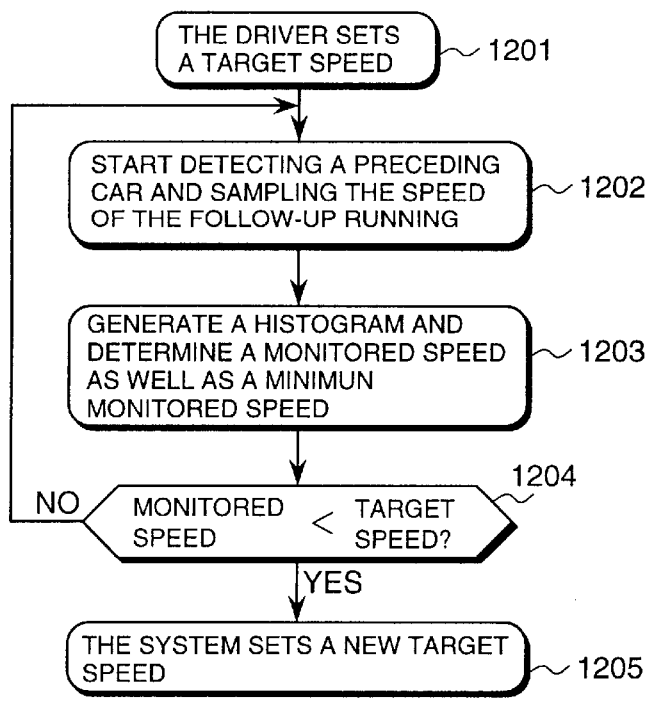
FIG. 8 is a schematic flow diagram showing a method for changing a set target speed by using the speed of a car running ahead of the vehicle as a base.

It should be noted that, while the present invention has been described with reference to an embodiment wherein speed control is carried out with a monitored speed used as a target speed as it is, the description is not intended to be construed in a limiting sense. That is to say, it is to be understood that a monitored speed does not have to be used as a target speed as it is. A target speed can also be set at a value which merely reflects a monitored speed. A method for setting a target speed by utilizing a monitored speed is explained by referring to a flowchart shown in FIG. 8.

To begin with, all roads in Japan each have a speed limit set by law. At a first step 1201 of the flowchart, the driver enters the lawful speed limits to the ICC system. The ICC unit 3 carries out running control by using a lawful speed as a target speed for the time being.

The flow of the procedure then goes on to a step 1202 at which the ICC system starts an operation to sample the relative speed Vr at a point of time a car running ahead of the ICC vehicle is detected. The flow of the procedure then proceeds to a step 1203 at which a histogram of the speed of the preceding car is generated from the speed Vs of the ICC vehicle and the relative speed Vr by using the same method as the one shown in FIG. 6. The histogram is then used for finding a monitored speed.

The flow of the procedure then continues to a step 1204 at which the monitored speed found at the step 1203 is compared with the current target speed. As described above, a lawful speed limit is initially used as the target speed this time. If the monitored speed is found higher than the target speed, the flow goes on to a step 1205 at which the target speed is set at another value lower than the monitored speed.

Figure 9:
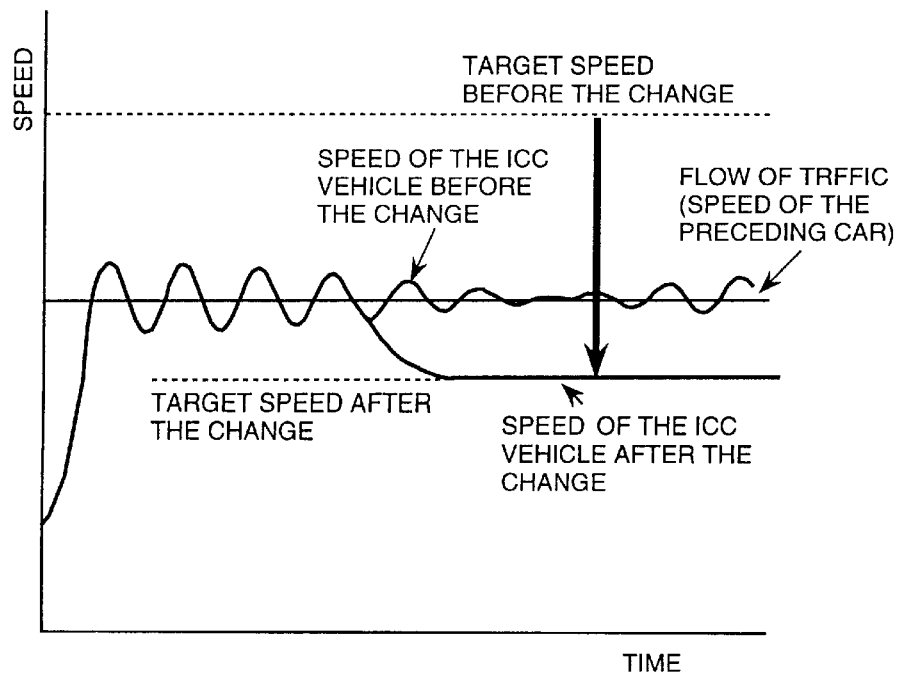
FIG. 9 is an explanatory diagram showing changes in vehicle speed following a change in target speed made in accordance with the flow of traffic.

After the target speed has been set at a new value, the ICC vehicle is running at a slightly longer distance from the preceding car. However, there is no change in speed that makes the passengers feel uncomfortable. This situations can be understood for example by referring to curves shown in FIG. 9 to represent change in speed with the lapse of time. If the target speed set at that time is higher than the flow of traffic which is represented by the speed of the preceding car, acceleration and deceleration are always carried out for hunting purposes in following up the preceding car. On the other hand, since the speed of the preceding car is higher than the target speed after the target speed has been set at a value lower than the monitored speed, the ICC system enters a constant-speed driving mode instead of a follow-up driving mode. As a result, the occurrence of acceleration and deceleration can be suppressed.

[2] Learning of the Car-to-car Distance

Normally, the ICC system controls the ICC vehicle so that the ICC vehicle runs by maintaining a fixed distance to a car running ahead of the vehicle which is determined by the running speed. The car-to-car distance can be typically set at a distance along which the ICC vehicle takes 2 seconds to run. At a running speed of 100 km/h, for example, the car-to-car distance is set at 56 m.

However, there are individual differences in the way the car-to-car distance is set among car drivers. A person may feel that a car-to-car distance of a certain value is too long but another person may feel that the same distance is too short.

Figure 10:
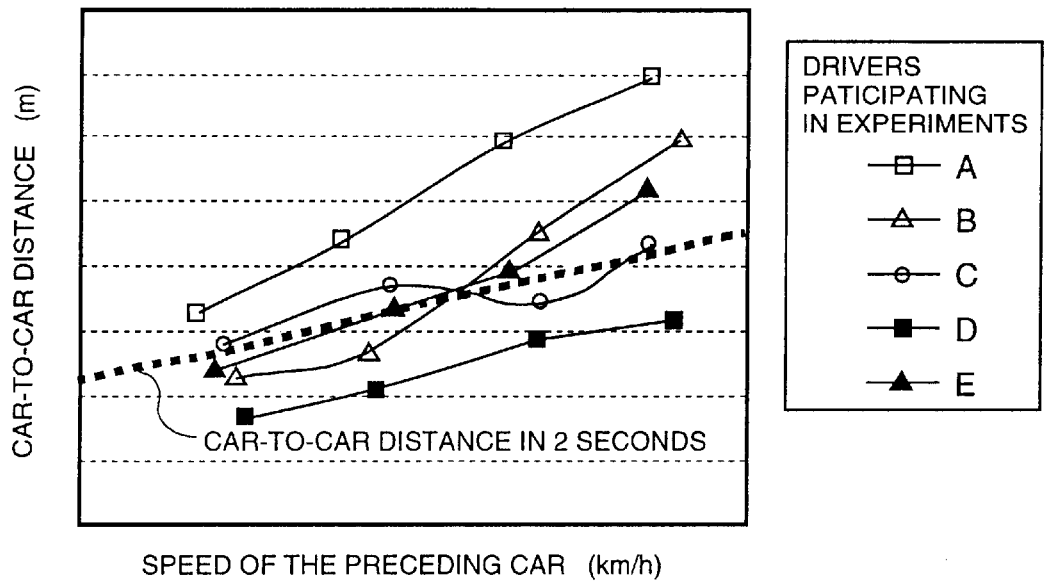
FIG. 10 is a diagram showing graphs representing data of individual variations in feeling for the car-to-car distance among car drivers for different car speeds in a cruise to follow a preceding car.

FIG. 10 is a diagram showing graphs representing data of individual variations in feeling for the car-to-car distance among car drivers for a different car speeds in a cruise to follow up a preceding car. The data has been obtained as results of experiments of follow-up driving using no ICC system. The horizontal axis of the graphs shown in the figure represents the speed of the preceding car while the vertical axis represents the car-to-car distance.

Each graph drawn as a solid line in FIG. 10 represents results conducted for a driver participating in the experiments. A dotted line shown in FIG. 10 represents a standard relation for a case in which the car-to-car distance is maintained at a distance along which the ICC vehicle takes 2 seconds to run. It is obvious from the figure that the altitudes and the gradients of the solid-line graphs are much different from those of the dotted-line graph. For this reason, a follow-up running control model based on the dotted-line graph drawn by using the concept of a fixed 2-second running distance may provide the driver with a feeling of dissatisfaction or anxiety. It is thus desirable to let the ICC system learn what car-to-car distance is to be set as desired by the driver.

For the reason described above, according to the present invention, the ICC system learns what car-to-car distance is to be set as desired by the driver at that time. As a result, a value at which the car-to-car distance used in the ICC control is set is changed to such a value that the distance becomes optimum to the driver. The following is description of two ways to learn the car-to-car distance.

Figure 11:
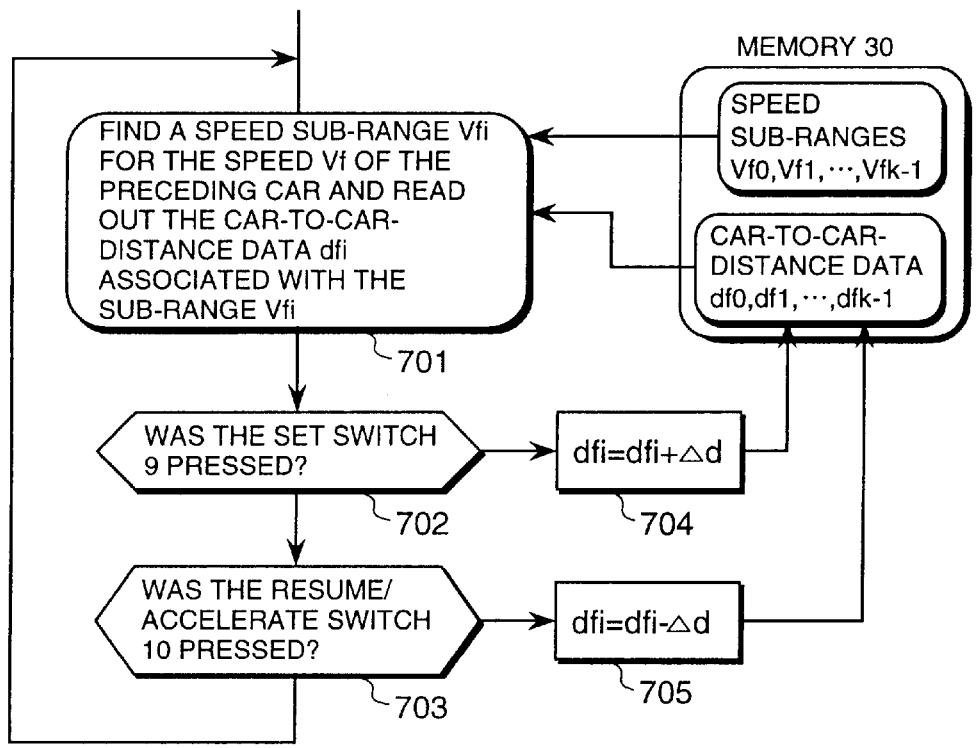
FIG. 11 is a schematic flow diagram showing a process embraced by the ICC system to learn a car-to-car distance optimum for the driver.

First of all, the first way in which the car-to-car distance is learned is explained by referring to a flowchart shown in FIG. 11.

In the process to learn and set a car-to-car distance shown in FIG. 11, the number of times the ICC set/coast switch 9 is operated is used in addition to the number of times the resume/accelerate switch 10 is operated. This is because the driver operates the ICC set/coast and resume/accelerate switches 9 and 10 in the course of follow-up running in order to increase or decrease the speed of the vehicle in an attempt to shorten or lengthen the car-to-car distance as the driver likes.

The ICC unit 3 is provided with a map stored in the memory unit 30 to represent a relation between the car speed and the car-to-car distance. To put it in detail, in the map, a range of the traveling speed at which a preceding car can run is divided into k speed sub-ranges [Vf0, Vf1, - - - , Vfk−1]. The map represents association of the speed sub- ranges [Vf0, Vf1, - - - , Vfk−1] with pieces of car-to-car- distance data [df0, df1, - - - , dfk−1] which are assigned to the speed sub-ranges [Vf0, Vf1, - - - , Vfk−1] respectively. In the present embodiment, a distance along which the ICC vehicle runs in two seconds at a representative car speed of one of the speed sub-ranges [Vf0, Vf1, - - - , Vfk−1] is used as an initial value preset for one of the pieces of car-to-car-distance data [df0, df1, - - - , dfk−1] associated with the speed sub-range.

As shown in FIG. 11, the flowchart begins with a step 701 at which the ICC unit 3 receives a detected speed Vf of a car running ahead of the ICC vehicle from the radar unit 2 and reads out the car-to-car-distance data associated with the car speed Vf from the map stored in the memory unit 30 with timing coinciding with the start of a learning process which is set or entered specially.

The flow of the procedure then goes on to a step 702 to verify whether or not the ICC set/coast switch 9 has been operated once. If the ICC set/coast switch 9 has not been operated yet, the flow continues to a step 703 to verify whether or not the assume/accelerate switch 10 has been operated once.

If the result of the verification carried out at the step 702 indicates that the ICC set/coast switch 9 has been operated, on the other hand, the flow proceeds to a step 704 at which a value set for the car-to-car-distance data dfi associated with a speed sub-range Vfi including the current car speed Vf is modified or set anew. The current set value dfi is modified or newly set by adding a correction variance Δd determined in advance to the value dfi. If a result of the verification carried out at the step 703 indicates that the resume/accelerate switch 10 has been operated, the flow proceeds to a step 705 at which the value set for the car-to-car-distance data dfi associated with a speed sub-range Vfi including the current car speed Vf is modified or set anew. In this case, however, the current set value dfi is modified or newly set by subtracting the correction variance Δd determined in advance from the value dfi. It should be noted that the correction variance Δd may have a value which varies in dependence upon the current car speed Vf.

In the first way to learn the car-to-car distance, the car-to-car distance is corrected or set anew each time the ICC set/coast or resume/accelerate switch 9 or 10 is operated. As a result, as the learning process is carried forward, car-to-car-distance data is set in accordance with what the driver desires.

Figure 12:
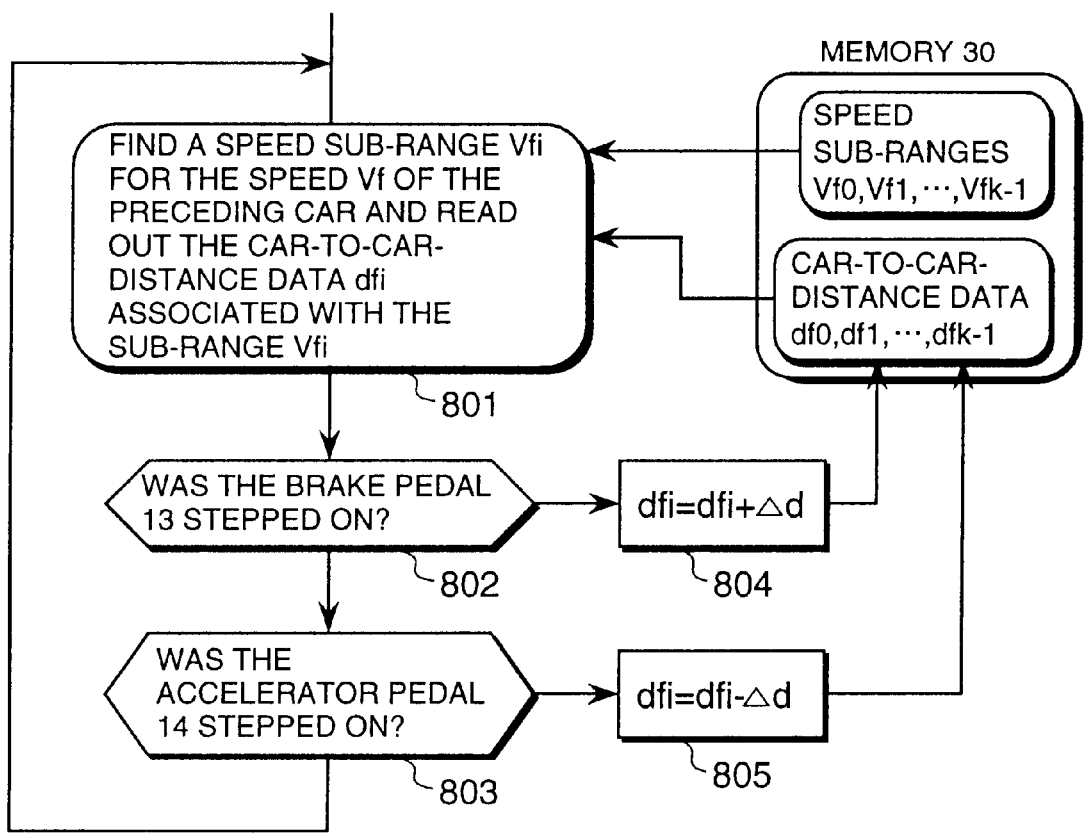
FIG. 12 is a schematic flow diagram showing a process to learn a car-to-car distance by detecting the number of times a brake is applied by the driver and the number of times an accelerator is applied by the driver.

Next, the second way in which the car-to-car distance is learned is explained by referring to a flowchart shown in FIG. 12.

In the process to learn and set a car-to-car distance shown in FIG. 12, the number of times the brake pedal 13 is operated is used in addition to the number of times the accelerator pedal 14 is operated.

The ICC unit 3 is provided with a map stored in the memory unit 30 to represent a relation between the car speed and the car-to-car distance. To put it in detail, in the map, a range of the traveling speed at which a preceding car can run is divided into k speed sub-ranges [Vf0, Vf1, - - - , Vfk−1]. The map represents association of the speed sub- ranges [Vf0, Vf1, - - - , Vfk−1] with pieces of car-to-car- distance data [df0, df1, - - - , dfk−1] which are assigned to the speed sub-ranges [Vf0, Vf1, - - - , Vfk−1] respectively. In the present embodiment, a distance along which the ICC vehicle runs in two seconds at a representative car speed of one of the speed sub-ranges [Vf0, Vf1, - - - , Vfk−1] is used as an initial value preset for one of the pieces of car-to-cardistance data [df0, df1, - - - , dfk−1] associated with the speed sub-range.

As shown in FIG. 12, the flowchart begins with a step 801 at which the ICC unit 3 receives a detected speed Vf of a car running ahead of the ICC vehicle from the radar unit 2 and reads out the car-to-car-distance data associated with the car speed vf from the map stored in the memory unit 30 with timing coinciding with the start of a learning process which is set or entered specially.

The flow of the procedure than goes on to a step 802 at which the ICC unit 3 examines a brake signal to verify whether or not the brake pedal 13 has been stepped on once.

If the brake pedal 13 has not been stepped on yet, the flow continues to a step 803 at which the ICC unit 3 examines an accelerator signal to verify whether or not the accelerator pedal 14 has been stepped on once. If a result of the verification carried out at the step 802 indicates that the driver desires that the car-to-car distance be adjusted, that is, if the brake pedal 13 has been stepped on, on the other hand, the flow proceeds to a step 804 at which a value set for the car-to-car-distance data dfi associated with a speed sub-range Vfi including the current car speed Vf is modified or set anew. The current set value dfi is modified or newly set by adding a correction variance Δd determined in advance to the value dfi. If a result of the verification carried out at the step 803 indicates that the accelerator pedal 14 has been stepped on, the flow proceeds to a step 805 at which the value set for the car-to-car-distance data dfi associated with a speed sub-range Vfi including the current car speed Vf is modified or set anew. In this case, however, the current set value dfi is modified or newly set by subtracting the correction variance Δd determined in advance from the value dfi. It should be noted that the correction variance Δd may have a value which varies in dependence upon the current car speed.

In the second way to learn the car-to-car distance, the car-to-car distance is corrected or set anew each time the brake or accelerator pedal 13 or 14 is stepped on. As a result, as the learning process is carried forward, car-to-car-distance data is set in accordance with what the driver desires and the number of times the brake and accelerator pedals 13 and 14 are stepped on is reduced.

By the way, it is desirable to carry out the process to learn the car-to-car distance under a condition in which the speed of the car running ahead of the ICC vehicle is relatively constant. This is because, under a condition of frequent repetition of acceleration and deceleration as is the case with running on a city road, effects of the traffic condition are much more reflected in the car-to-car distance than the desire of the driver so that it is quite within the bounds of possibility that the learning process produces incorrect results. For this reason, when the speed of the preceding car is sampled, for example, the rate of change in speed Dv of the preceding car observed during a fixed period of time in the past as expressed by Eq. 8 is evaluated. A rate of change in speed Dv greater than a predetermined value indicates an excessively large change in speed occurring in the preceding car which is not appropriate for a learning process. In this case, typically, sampled data is not used in the process of learning the car-to-car distance.

$$Dv = (Vfmax - Vfmin)/Vfmean \quad (8)$$

where Dv: the rate of change in speed of the preceding car
Vfmean: the average value of the speed of the preceding car
Vfmin: the minimum value of the speed of the preceding car
Vfmax: the maximum value of the speed of the preceding car In addition, an ICC vehicle may be driven by a plurality of drivers. In this case, it is necessary to learn a driving characteristic for each driver. For this reason, a memory for storing some learning patterns can be provided, allowing the driver to select a pattern to be used by operating a switch.

Another method can also be used in the operation to correct set data. For example, a volume-type switch can be provided for use in the adjustment of the car-to-car distance. The car-to-car distance can then be set linearly in proportion to the rotation of the volume-type switch. As an alternative, a voice recognition technology can be applied to implement a learning process based on words spoken by the driver.

[3] Learning of the Follow-up Characteristic

Figure 3:
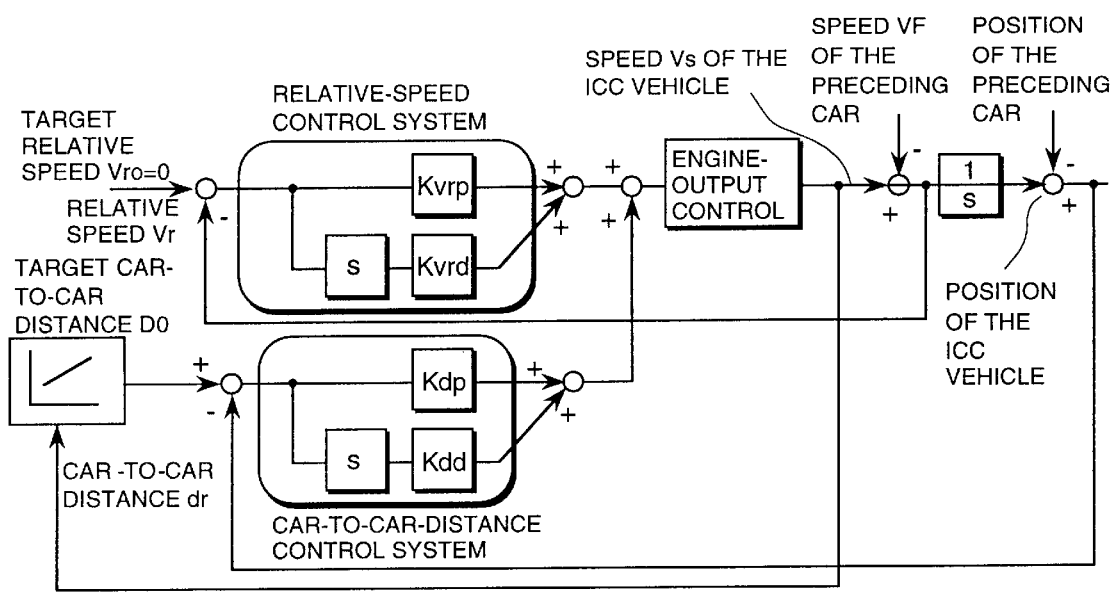
FIG. 3 is a block diagram showing a vehicle-to-vehicle distance control system for carrying out control so as to maintain the distance from a vehicle to a car running ahead of the vehicle at a constant value and sustain the speed of the vehicle at a zero relative speed of the preceding car with respect to the vehicle.

As described in the explanation of the control system shown in FIG. 3, the characteristic of an ICC vehicle to follow up a car running ahead of the vehicle varies considerably from driver to driver due to differences in preference among the individuals. Initially setting the relative-speed control gains kvrp and kvrd which affect the follow-up characteristic at fixed values may provide the driver with a feeling of dissatisfaction or anxiety. In order to solve this problem, in the present invention, the adjustment of the acceleration and deceleration gains is based on accumulation times ta and tr, to be described alter, during which the ICC set/coast switch 9 and the ICC resume/accelerate switch 10 respectively are being pressed continuously. In this way, an optimum follow-up characteristic desired by the driver can be obtained. Details of the process to learn a follow-up characteristic are explained by referring to a flowchart shown in FIG. 13.

The term "acceleration mode" used in the following description means a state in which the relative speed Vr is positive (Vr>0) or a state in which the car-to-car distance is becoming longer. On the other hand, the term "deceleration mode" means a state in which the relative speed Vr is negative (Vr<0) or a state in which the car-to-car distance is becoming shorter. Finally, the term "constant speed" means a state in which the relative speed Vr is zero (Vr=0) or a state in which the car-to-car distance is kept at a constant value.

Figure 13:
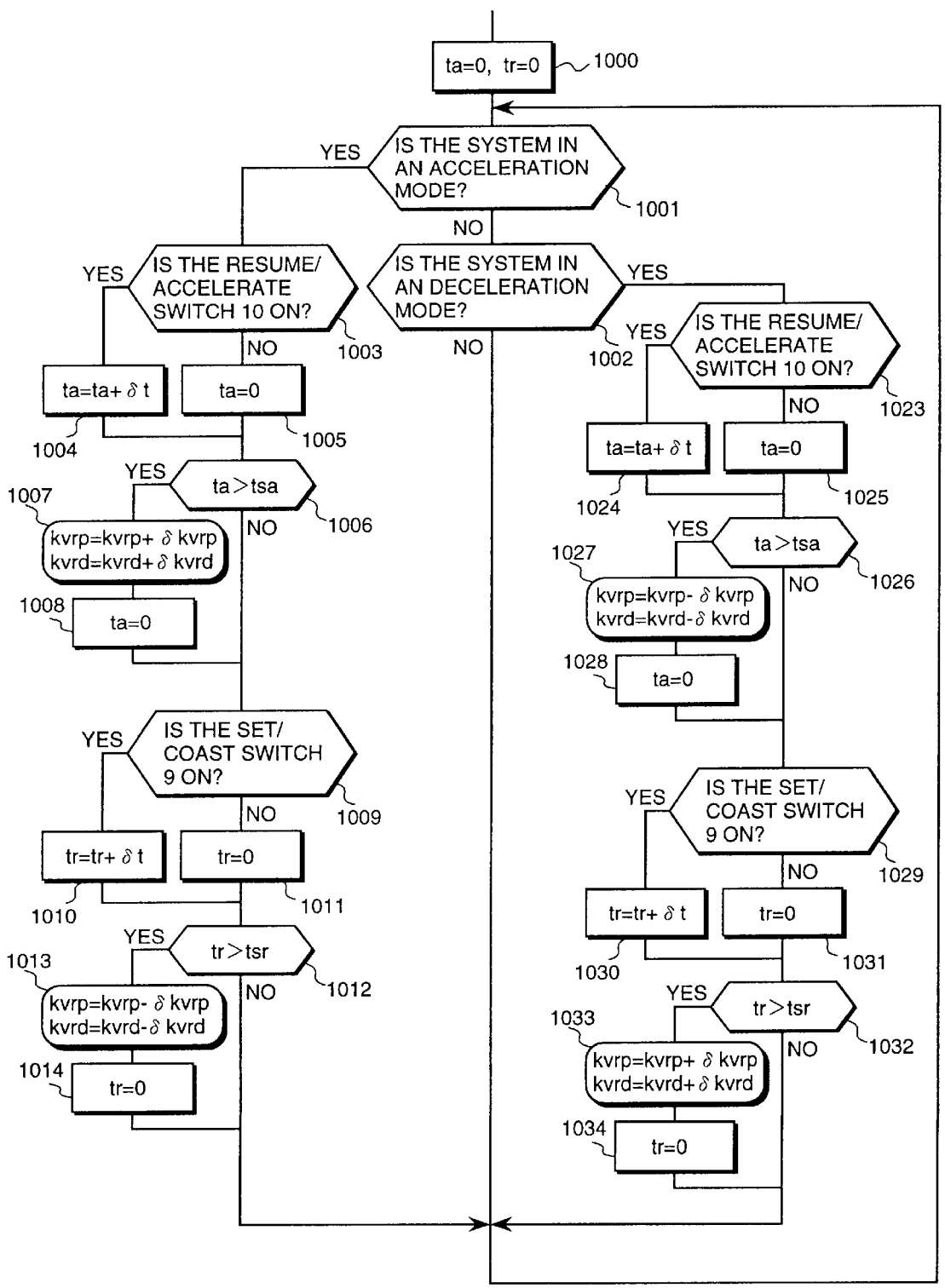
FIG. 13 is a schematic flow diagram showing a process embraced by the ICC system to learn a follow-up characteristic during an acceleration or deceleration which is optimum for the driver.

As shown in FIG. 13, the flowchart begins with a step 1000 at which the accumulation times ta and tr are initialized to zeros (ta=tr=0). As described above, the accumulation times ta and tr are periods of time during which the ICC set/coast switch 9 and the ICC resume/accelerate switch 10 respectively are being pressed continuously. The accumulation times ta and tr are measured by a timer embedded in the ICC unit 3.

The flow of the learning process then goes on to a step 1001 at which the ICC unit 3 forms a judgment based on the relative speed Vr as to whether or not the ICC system is in an acceleration mode. If the ICC system is in an acceleration mode, that is, if Vr>0, the flow of the learning process proceeds to steps 1003 to 1014. If the ICC system is not in an acceleration mode, on the other hand, the flow continues to a step 1002 to form a judgment based on the relative speed Vr as to whether or not the ICC system is in a deceleration mode. If the ICC system is in a deceleration mode, that is, if Vr<0, the flow of the learning process proceeds to steps 1023 to 1034.

In the first place, pieces of processing carried out at the steps 1003 to 1014 are explained.

Pieces of processing are carried out at the steps 1003 to 1008 to increase gains. To put it in detail, at the step 1003, the ICC unit 3 forms a judgment as to whether or not the resume/accelerate switch 10 is being pressed. If the outcome of the judgment indicates that the resume/accelerate switch 10 is being pressed, the flow of the learning process goes on to the step 1004 at which a variance Δt determined in advance is added to the current accumulation time ta. If the outcome of the judgment indicates that the resume/accelerate switch 10 is not being pressed, that is, if the resume/accelerate switch 10 is turned off, on the other hand, the flow proceeds to a step 1005 at which the accumulation time ta is reset to zero (ta=0). After the step 1004 or 1005, the flow of the learning process then continues to a step 1006 at which the ICC unit 3 compares the current accumulation time ta with a time tsa determined in advance. If the outcome of the comparison indicates that the accumulation time ta is greater than the predetermined time tsa (ta>tsa), the flow goes on to a step 1007 at which a gain variance bkvrp determined in advance is added to the gain kvrp and a gain variance bkvrd also determined in advance is added to the gain kvrd in order to set the gains anew. As a result, the follow-up response to run after the preceding car can be speeded up. Then, the flow of the learning process goes on to a step 1008 to once clear the accumulation time ta to zero (ta=0) before proceeding to a step 1009. It should be noted that, if the outcome of the comparison made at the step 1006 indicates that the accumulation time ta is equal to or smaller than the predetermined time tsa (ta≦tsa), on the other hand, the flow also goes on to the step 1009.

On the other hand, pieces of processing are carried out at the steps 1009 to 1014 to decrease the gains. To put it in detail, at the step 1009, the ICC unit 3 forms a judgment as to whether or not the set/coast switch 9 is being pressed. If the outcome of the judgment indicates that the set/coast switch 9 is being pressed, the flow of the learning process goes on to the step 1010 at which the variance Δt determined in advance is added to the current accumulation time tr. If the outcome of the judgment indicates that the set/coast switch 9 is not being pressed, that is, if the set/coast switch 9 is turned off, on the other hand, the flow proceeds to a step 1011 at which the accumulation time tr is reset to zero (tr=0). After the step 1010 or 1011, the flow of the learning process then continues to a step 1012 at which the current accumulation time tr is compared with a time tsr determined in advance. If the outcome of the comparison indicates that the accumulation time tr is greater than the predetermined time tsr (tr>tsr), the flow goes on to a step 1013 at which the gain variance δkvrp determined in advance is subtracted from the gain kvrp and the gain variance δkvrd also determined in advance is subtracted from the gain kvrd in order to set the gains anew. As a result, the follow-up response to run after the preceding car can be slowed down. Then, the flow of the learning process goes on to a step 1014 to once clear the accumulation time tr to zero (tr=0) before returning to the step 1001. It should be noted that, if the outcome of the comparison made at the step 1012 indicates that the accumulation time tr is equal to or smaller than the predetermined time tsr (tr≦tsr), on the other hand, the flow also returns to the step 1001.

As described above, if the outcomes of the judgments formed at the steps 1001 and 1002 indicate that the ICC system is in a deceleration mode, that is, if Vr<0, the flow of the learning process proceeds to steps 1023 to 1034. In a deceleration mode, the gains kvrp and kvrd are changed in ways opposite to those in an acceleration mode. To be more specific, in a deceleration mode, the gains kvrp and kvrd are decreased when the accumulation time ta is greater than the predetermined time tsa or increased when the accumulation time tr is greater than the predetermined time tsr as follows.

Pieces of processing are carried out at the steps 1023 to 1028 to decrease the gains. To put it in detail, at the step 1023, the ICC unit 3 forms a judgment as to whether or not the resume/accelerate switch 10 is being pressed. If the outcome of the judgment indicates that the resume/accelerate switch 10 is being pressed, the flow of the learning process goes on to the step 1024 at which the variance δt determined in advance is added to the current accumulation time ta. If the outcome of the judgment indicates that the resume/accelerate switch 10 is not being pressed, that is, if the resume/accelerate switch 10 is turned off, on the other hand, the flow proceeds to a step 1025 at which the accumulation time ta is reset to zero (ta=0). After the step 1024 or 1025, the flow of the learning process then continues to a step 1026 at which the current accumulation time ta is compared with the time tsa determined in advance. If the outcome of the comparison indicates that the accumulation time ta is greater than the predetermined time tsa (ta>tsa), the flow goes on to a step 1027 at which the gain variance δkvrp determined in advance is subtracted from the gain kvrp and the gain variance δkvrd also determined in advance is subtracted from the gain kvrd in order to set the gains anew. As a result, the follow-up response to run after the preceding car can be slowed down. Then, the flow of the learning process goes on to a step 1028 to once clear the accumulation time ta to zero (ta=0) before going on to a step 1029. It should be noted that, if the outcome of the comparison made at the step 1026 indicates that the accumulation time ta is equal to or smaller than the predetermined time tsa (ta≦tsa), on the other hand, the flow also proceeds to the step 1029.

On the other hand, pieces of processing are carried out at the steps 1029 to 1034 to increase the gains. To put it in detail, at the step 1029, the ICC unit 3 forms a judgment as to whether or not the set/coast switch 9 is being pressed. If the outcome of the judgment indicates that the set/coast switch 9 is being pressed, the flow of the learning process goes on to the step 1030 at which the variance δt determined in advance is added to the current accumulation time tr. If the outcome of the judgment indicates that the set/coast switch 9 is not being pressed, that is, if the set/coast switch 9 is turned off, on the other hand, the flow proceeds to a step 1031 at which the accumulation time tr is reset to zero (tr=0). After the step 1030 or 1031, the flow of the learning process then continues to a step 1032 at which the current accumulation time tr is compared with the time tsr determined in advance. If the outcome of the comparison indicates that the accumulation time tr is greater than the predetermined time tsr (tr>tsr), the flow goes on to a step 1033 at which the gain variance δkvrp determined in advance is added to the gain kvrp and the gain variance δkvrd also determined in advance is added to the gain kvrd in order to set the gains anew. As a result, the follow-up response to run after the preceding car can be speeded up. Then, the flow of the learning process goes on to a step 1034 to once clear the accumulation time tr to zero (tr=0) before returning to the step 1001. It should be noted that, if the outcome of the comparison made at the step 1012 indicates that the accumulation time tr is equal to or smaller than the predetermined time tsr (tr≦tsr), on the other hand, the flow also returns to the step 1001.

According to the learning process described above, even when the preceding car decelerates, causing the relative value Vr to turn from positive to negative, that is, causing the ICC system to get in a deceleration mode, the ICC unit 3 keeps increasing the gains as long as the accumulation time tr is greater than the predetermined time tsr (tr>tsr). However, braking in a deceleration mode is different from that in acceleration mode. In an acceleration mode which requires a greater deceleration, braking by a brake is used rather than adjustment of the output of the engine. For example, when the set/coast and resume/accelerate switches 9 and 10 are being pressed continuously for more than a predetermined period of time, the speed control can be turned off and an engine brake is applied. In addition, when the set/coast and resume/accelerate switches 9 and 10 are being pressed continuously for a predetermined period of time, the automatic brake unit 4 can be further operated.

[4] Learning of the Start Point of the Auto Brake

Figure 14:
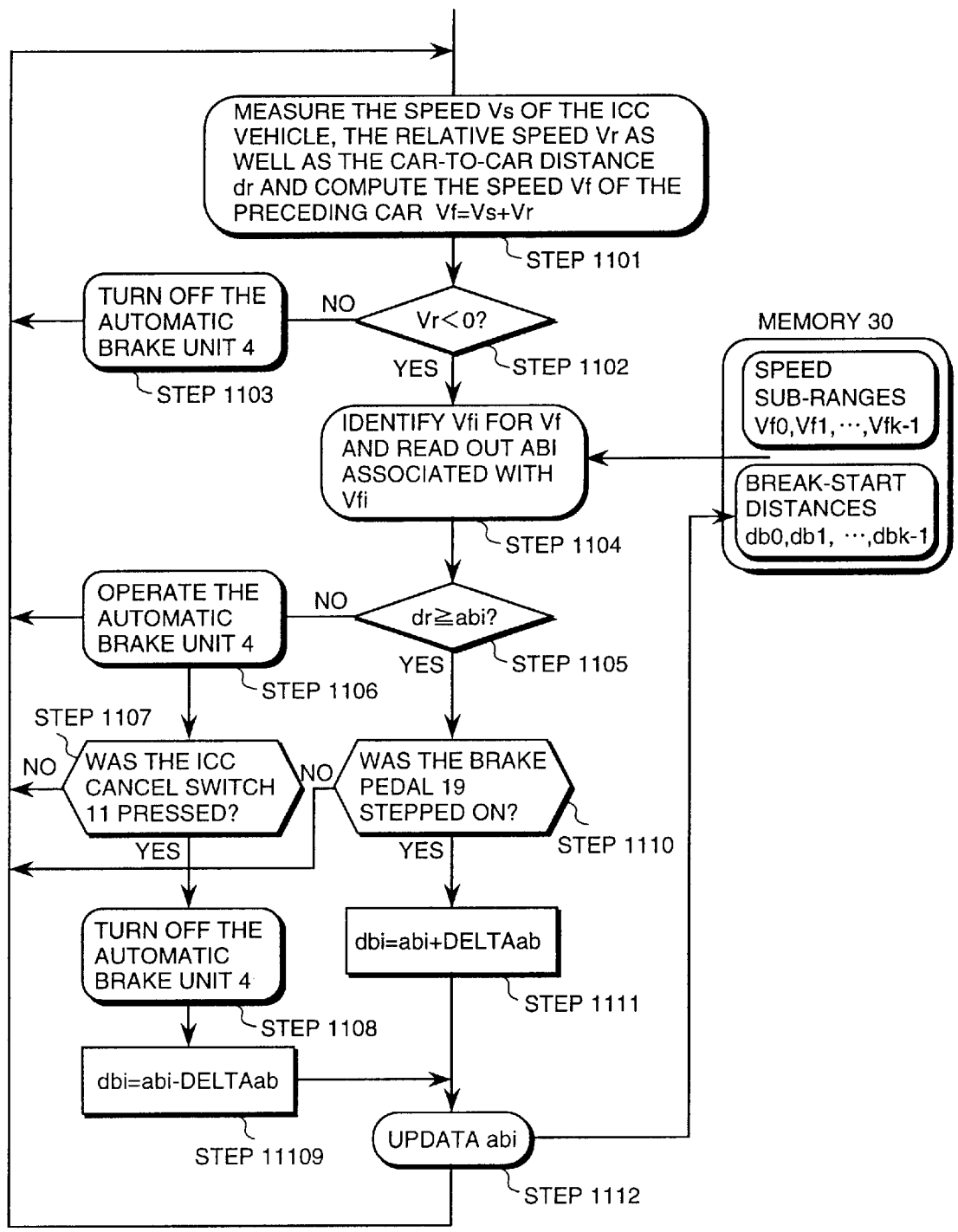
FIG. 14 is a schematic flow diagram showing a process embraced by the ICC system to learn how to apply an automatic brake unit so as to give a braking operation close to the normal braking sense of the driver.

The way in which deceleration is accomplished by using a brake also varies considerably from driver to driver due to differences in preference among the individuals. To put it in detail, some drivers desire to decelerate the ICC vehicle gradually, starting from a pretty long distance to a car running ahead of the vehicle while others prefer to decelerate the vehicle by applying a big braking force after the vehicle has approached the preceding car to a certain degree. For this reason, if the vehicle is provided with an ICC system wherein the target deceleration is set at a fixed value and a brake is always applied, starting from a position at a distance to the preceding car which is determined only by the speed, there will be raised a problem caused by differences in driving sense among individuals. In order to solve this problem, in the present invention, the way in which the driver is applies a brake is monitored in the course of running in order to learn the starting point of the automatic brake unit at a short car-to-car distance. The learning process is explained by referring to a flowchart shown in FIG. 14 as follows.

The ICC unit 3 is provided with a map stored in the memory unit 30 to represent a relation between the speed Vf of the preceding car and the car-to-car distance at which an operation to apply a brake should be started. To put it in detail, in the map, a range of the traveling speed at which a preceding car can run is divided into k speed sub-ranges [Vf0, Vf1, - - - , Vfk−1]. The map represents association of the speed sub-ranges [Vf0, Vf1, - - - , Vfk−1] with pieces of brake-start-distance data [db0, db1, dbk−1] which are assigned to the speed sub-ranges [Vf0, Vf1, - - - , Vfk−1] respectively as set values.

As shown in the figure, the flowchart begins with a step 1101 at which the ICC unit 3 calculates the speed Vf of a preceding car (Vf=Vs+Vr) from the speed of the ICC vehicle Vs and the relative speed Vr as well as the car-to-car distance dr measured by the radar unit 2. The flow of the learning process then goes on to a step 1102 to find out whether the relative speed Vr is positive or negative.

If the relative speed Vr is found positive or zero (Vr≧0), it is not necessary to apply a brake. In this case, the flow proceeds to a step 1103 at which the ICC unit 3 turns off the automatic brake unit 4. Then, the flow returns to the step 1101. If the relative speed Vr is found negative (Vr<0) at the step 1102, on the other hand, the flow continues to a step 1104.

At the step 1104, the ICC unit 3 reads out a brake-start-distance data dbi from the memory unit 30 set for a speed sub-range Vfi that includes the current speed Vf of the preceding car. The flow of the learning process then goes on to a step 1105 at which the ICC unit 3 compares the present car-to-car distance dr with the brake-start-distance data dbi. If the outcome of the comparison indicates that the present car-to-car distance dr is smaller than the brake-start-distance data dbi (dr<dbi) the flow proceeds to a step 1106 at which the ICC unit 3 turns on the automatic brake unit 4. The flow then continues to a step 1107 at which the IC unit 3 checks the operation state of the ICC cancel switch 11. If the driver thinks that, at this distance, the operation of the automatic brake unit 4 is too early, the drive will press the ICC cancel switch 11 to cancel the operation of the automatic brake unit 4. If the ICC cancel switch 11 is found pressed at the step 1107, the flow of the learning process goes on to a step 1108 at which the ICC unit 3 suspends the operation of the automatic brake unit 4. The flow then proceeds to a step 1109 at which the ICC unit 3 corrects the brake-start-distance data dbi set for a speed sub-range vfi that includes the speed Vf of the preceding car at the cancel point by reducing the brake-start-distance data dbi. To put it in detail, a variance δdb determined in advance is subtracted from the brake-start-distance data dbi used up to this point. The flow of the learning process then continues to a step 1112 at which the modified brake-start-distance data dbi is used as a new set value. As a result, the operation-start position of the automatic brake unit 4 thereafter is closer to the preceding car than the operation-start position used previously.

If the ICC cancel switch 11 is found not pressed at the step 1107, on the other hand, the flow returns the step 1101 with the automatic brake unit 4 left in an operating state as it is.

If the outcome of the comparison made at the step 1105 indicates that the present car-to-car distance dr is equal to or greater than the brake-start-distance data dbi (dr≧dbi), on the other hand, the flow proceeds to a step 1110 at which the ICC unit 3 forms a judgment as to whether or not the driver has stepped on the brake pedal 13. If the driver has stepped on the brake pedal 13, it is a matter of course that the operation carried out by the driver takes precedence, starting a braking operation. It means that the operation-start position of the automatic brake unit 4 has been set at a position closer to the preceding car than that desired by the driver. Thus, in this case, the flow of the learning process goes on to a step 1111 at which the brake-start-distance data dbi set for a speed sub-range Vfi including the current speed Vf of the preceding car is corrected to a greater value. To put it in detail, a variance Δdb determined in advance is added to the brake-start-distance data dbi used up to this point. The flow of the learning process then continues to the step 1112 at which the modified brake-start-distance data dbi is used as a new set value. As a result, the operation-start position of the automatic brake unit 4 thereafter is further away from the preceding car than the operation-start position used previously.

After completing processing of the step 1112, the flow returns to the step 1101 to repeat the same pieces of processing.

By carrying out the learning process described above, the way in which a brake is applied can be made closer to what the driver desires.

If the car-to-car distance dr decreases due to deceleration by the preceding car, the ICC unit 3 first of all performs deceleration control by adjusting the output of the engine. If the deceleration by the adjustment of the output of the engine is not sufficient, resulting in a car-to-car distance shorter than or equal to the brake-start-distance data dbi set for the speed sub-range Vfi including the current speed Vf of the preceding car, braking by the automatic brake unit 4 is started. In this state, the speed control itself is turned off and the ICC vehicle gets in an engine-brake state. Thereafter, braking is done by operation of the brake pedal carried out by the driver. Here, if the relative speed Vr turns from negative to positive (Vr>0) due to acceleration started by the preceding car, speed control to follow up the preceding car is resumed. In addition, if the driver presses the ICC cancel switch 11 once more, the ICC system itself is turned off. In such a state, the speed control to follow up the preceding car will not be resumed unless the driver presses the ICC set/coast switch 9 to set the ICC system again.

So far, the following processes of learning a variety of quantities required for the ICC control have been explained:

[1] Setting of the target speed
[2] Learning of the car-to-car distance
[3] Learning of the follow-up characteristic
[4] Learning of the start point of the auto brake The processes of learning various quantities described above are not only applicable to a case of a combination with the operation of an automatic brake unit carried out in accordance with quantities such as the car-to-car distance, but also effective for a combination with the conventional adjustment of the car speed which has been carried out traditionally.

Next, control to avoid a head-on collision of the ICC vehicle with a counter traveling car is explained.

On a two-way ordinary road, there are normally cars running along lanes on the other side of the center line of the road which divides the road longitudinally into two halves in a direction opposite to that of the ICC vehicle. Let such cars be each referred to hereafter simply as a counter traveling car. Normally, a counter traveling car is running along a lane on the half of road on the other side of the center line. Let such a lane be referred to hereafter simply as a counter-traveling-car lane. Thus, there is no fear of a head-on collision of the ICC vehicle with a counter traveling car. However, a counter traveling car may cross the canter line, intruding into a lane on the half of the road on this side on which the ICC vehicle is running because, for example, the counter traveling car makes an attempt to avoid an automobile parked on the shoulder-side lane on the other half of the road. In such a situation, it is desirable to reduce the speed of the ICC vehicle in accordance with the relative speed Vr of the counter traveling car with respect to ICC vehicle and the distance dr between the ICC vehicle and the counter traveling car so as to prevent a head-on collision of the ICC vehicle with the counter traveling car from occurring. The following is description of control to avoid a head-on collision of the ICC vehicle with such a counter traveling car with reference to a positional relation between the ICC vehicle and the counter traveling car shown in FIG. 15 and a flowchart shown in FIG. 16.

Figure 15:
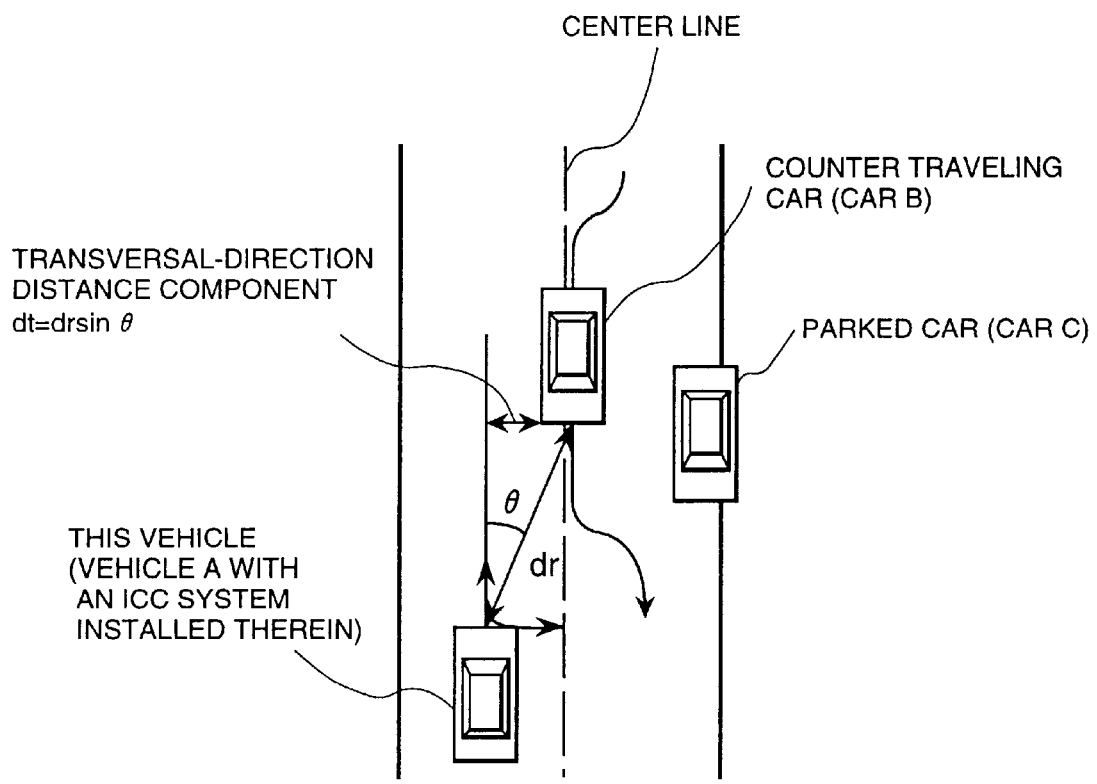
FIG. 15 is an explanatory diagram showing a state of a control operation which is carried out by the ICC system when an oppositely traveling car is approaching.

First of all, an outline of a state in which an ICC vehicle and a counter traveling car are about to pass by each other is explained by referring to FIG. 15.

FIG. 15 shows a state in which a vehicle A with an ICC system installed therein is running on a lane of an ordinary two-way road. At that time, a counter traveling car B is running on the counter-traveling-car lane on the other side of the center line of the road in a direction opposite to the ICC vehicle A. In addition, an automobile C is parked on the same lane as the counter traveling car on the shoulder side of the road.

In order to avoid the parked automobile C, the counter traveling car B crosses the center line, intruding into the lane along which the ICC vehicle A is running. At that time, the radar unit 2 of the ICC vehicle detects the approaching by the counter traveling car B, finding the relative speed Vr. The ICC unit 3 forms a judgment that it is a counter traveling car B that is running on the same lane from the fact that the absolute value of the relative speed Vr is greater than the running speed Vs of its own ICC vehicle A.

Figure 16:
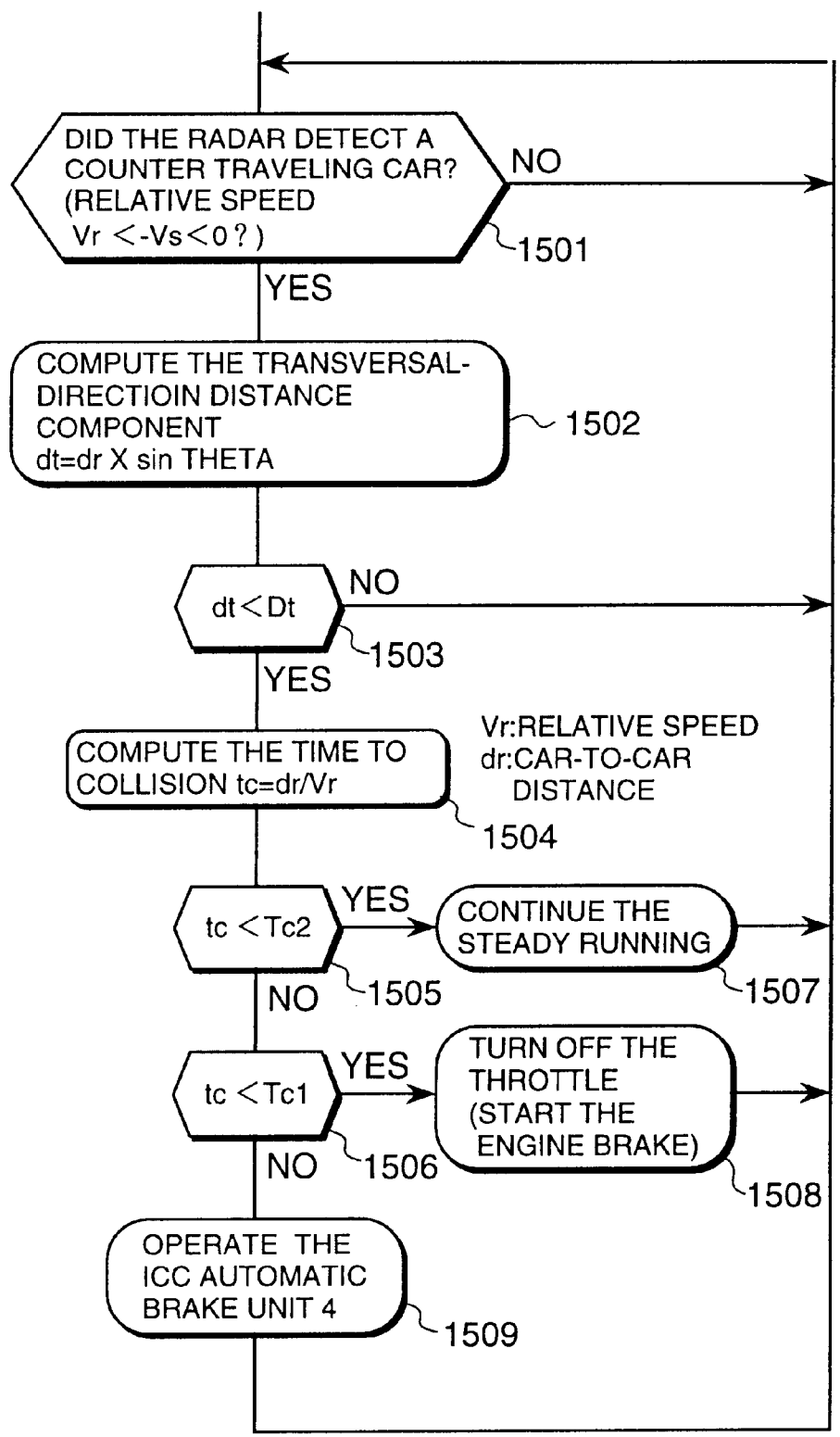
FIG. 16 is a schematic flow diagram showing a processing procedure of control which is executed by the ICC system when an oppositely traveling car is approaching.

The radar unit 2 further finds the car-to-car distance dr. The radar unit 2 also finds an angle θ formed by a line connecting the ICC vehicle A to the counter traveling car B and the running direction of the ICC vehicle A from pulses of two beams reflected by the preceding car and the counter traveling car B. The transversal component dt (=dr×sin θ) of the car to car distance dr is then calculated. A transversal-direction component dt smaller than a limit Dt set in advance indicates that the counter traveling car B has crossed the center line. In this case, processing in a mode for dealing with a counter traveling car B represented by the flowchart shown in FIG. 16 is invoked.

A procedure of the processing in a mode for dealing with a counter traveling car B followed by the ICC system is explained by referring to the flowchart shown in FIG. 16 as follows.

As shown in the figure, the flowchart begins with a step 1501 to form a judgment as to whether or not a counter traveling car B is approaching by finding out whether or not the relative speed Vr received from the radar unit 2 satisfies the relation Vr<-Vs <0 where notation Vs is the speed of the ICC vehicle A. If the outcome of the judgment indicates that a counter traveling car B is approaching, the flow of the processing procedure goes on to a step 1502 at which the ICC unit 3 computes the transversal-direction component dt (=dr×sin θ) of the car to car distance dr. The flow then proceeds to a step 1503 at which the transversal-direction component dt is compared with the limit Dt set in advance. If the outcome of the comparison indicates that the transversal-direction component dt is smaller than the limit Dt (dt<Dt), the flow of the processing procedure continues to a step 1504.

At the step 1504, the ICC unit 3 calculates a time to a hypothetical collision tc (=dr/Vr), that is, a time the ICC vehicle A takes to come into a head-on collision with the counter traveling car B, from the relative speed Vr and the car-to-car distance dr. The flow of the processing procedure then continues to a step 1505 to compare the time to a hypothetical collision tc with a threshold value Tc2 and then probably to a step 1506 at which the time to a hypothetical collision tc is compared with another threshold value Tc1 where Tc1 <Tc2.

If the outcome of the comparison made at the step 1505 indicates that the time to a hypothetical collision tc is longer than the threshold value Tc2 (Tc2<tc), the present car-to-car distance is considered to be still long enough. In this case, the flow goes on to a step 1507 at which a decision is made to continue maintaining the steady running state at a fixed speed. The flow then returns to the step 1501.

If the outcome of the comparison made at the step 1505 indicates that the time to a hypothetical collision tc is equal to or shorter than the threshold value Tc2 (Tc2≧tc), on the other hand, the flow goes on to a step 1506. If the outcome of the comparison made at the step 1506 indicates that the time to a hypothetical collision tc is longer than the threshold value Tc1 (Tc1<tc≦Tc2), the flow goes on to a step 1508 to put the ICC speed control in a deceleration mode in which the throttle is turned off and deceleration based on an engine brake is started. Then, the flow returns to the step 1501.

It should be noted that, at the steps 1508 and 1507, a buzzer can be turned on to generate sound for notifying the driver that a counter traveling car B is approaching.

If the outcome of the comparison made at the step 1506 indicates that the time to a hypothetical collision tc is equal to or shorter than the threshold value Tc1 (tc<Tc1), on the other hand, the flow of the processing procedure goes on to a step 1509 at which the auto brake unit 4 is operated to start deceleration. Then, the flow returns to the step 1501.

The processing described above is carried out each time the speed of the counter traveling car B is sampled. In a normal case, the counter traveling car B is expected to rapidly return to the original lane thereof and decelerates after passing the parked automobile C. As the counter traveling car B returns to the original lane, the transversal-direction component dt of the car-to-car distance dr becomes longer than the predetermined limit value Dt, leading to a judgment that the risk of the imminent head-on collision of the ICC vehicle with the counter traveling car B has disappeared. As a result, the mode for processing to deal with a counter traveling car B described above can be terminated.

The processing described above is not only useful for preventing a head-on collision of the ICC vehicle A with a counter traveling car B from occurring, but also an effective means for avoiding a collision of the ICC vehicle A with a static object ahead.

It is desirable to set the thresholds Tc1 and Tc2 at such values based on the braking power of the ICC vehicle and the automatic brake unit 4 that deceleration can be carried out in a reasonable way. For example, it is possible to determine the threshold values Tc1 and Tc2 by experiments by considering a time the ICC vehicle A takes to decelerate to a target speed (that is, a deceleration target speed) and the relative speed at which the ICC vehicle A and the counter traveling car B are about to pass by each other.

It should be noted that the time the ICC vehicle A takes to decelerate to a predetermined speed when running at the maximum deceleration $\alpha_{rmax}$ can be calculated by using Eq. 3 as described above.

It is worth noting that, when applying the present invention, it is not necessary to provide all the configurations described above. In addition, the configurations can be properly combined with each other if necessary.

As described above, according to the present invention, it is possible to implement follow-up running matching the flow of traffic in a reasonable way. In addition, since learning processes are carried out to reflect driving preferences of individual drivers in control target values, it is possible to implement follow-up running control and control for dealing with a counter traveling car without providing a sense of incompatibility to the driver. Further, a head-on collision of the ICC vehicle with a counter traveling car can also be avoided as well.

What is claimed is:

1. An intelligent cruise control system for a moving body for controlling the cruise of said moving body, said system comprising:
    a distance detecting means for measuring a distance from said moving body to an object of attention existing in front of said moving body;
    a speed detecting means for measuring the speed of said moving body;
    a braking-distance estimating means for estimating a distance along which said moving body travels to decelerate to a specially set deceleration target speed; and
    a deceleration means for comparing an estimated braking distance estimated by said braking-distance estimating means with a distance measured by said distance detecting means and for decelerating said moving body if a comparison result indicates that said estimated braking distance is longer.

2. An intelligent cruise control system for a moving body according to claim 1 further comprising:
    a constant-speed running means for letting said moving body run at a specially determined target speed; and
    a target-speed modifying means for comparing said estimated braking distance with a distance measured by said distance detecting means and for reducing said target speed if a comparison result indicates that said estimated braking distance is longer.

3. An intelligent cruise control system for a moving body for controlling the cruise of said moving body, said system comprising:
    a distance detecting means for measuring a distance from said moving body to an object of attention existing in front of said moving body;
    a relative-speed detecting means for measuring a relative speed of said moving body with respect to said object of attention;
    a speed detecting means for measuring the speed of said moving body;
    a time-to-collision estimating means for estimating a time to a collision with said object of attention from a relative speed measured by said relative-speed detecting means and a distance measured by said distance detecting means;
    a braking-time estimating means for estimating a time it takes to decelerate said moving body to a specially determined deceleration target speed; and
    a deceleration means for comparing an estimated braking time estimated by said braking-time estimating means with a time estimated by said time-to-collision estimating means and for decelerating said moving body if a comparison result indicates that said estimated braking time is longer.

4. An intelligent cruise control system for a moving body according to claim 3 further comprising:
    a constant-speed running means for letting said moving body run at a specially determined target speed; and
    a target-speed modifying means for comparing said estimated braking time with a time estimated by said time-to-collision estimating means and for reducing said target speed if a comparison result indicates that said estimated braking time is longer.

5. An intelligent cruise control system for a moving body according to claim 1 further comprising:
    a speed monitoring means for measuring the speed of said moving body or said object of attention;
    a minimum-monitored-speed determining means for selecting a speed representing a lowest speed range as a minimum monitored speed among speed ranges each with a speed-occurrence count equal to or greater than a predetermined threshold value with said speed-occurrence count obtained as a result of monitoring carried out by said speed monitoring means during a specially determined period of time; and
    a deceleration-target-speed determining means for determining said deceleration target speed based on said minimum monitored speed.

6. An intelligent cruise control system for a moving body according to claim 5 wherein said deceleration-target-speed determining means uses said minimum monitored speed as said deceleration target speed as it is.

7. An intelligent cruise control system for a moving body for controlling the cruise of said moving body, said system comprising:
    a speed monitoring means for measuring the speed of said moving body or an object of attention existing in front of said moving body;
    a monitored-speed determining means for selecting a speed representing a highest speed range as a monitored speed among speed ranges each with a speed-occurrence count equal to or greater than a predetermined threshold value with said speed-occurrence count obtained as a result of monitoring carried out by said speed monitoring means during a specially determined period of time;

a target-speed determining means for determining a target speed based on said monitored speed; and a constant-speed running means for letting said moving body run at said determined target speed.

8. An intelligent cruise control system for a moving body according to claim 7 wherein said target-speed determining means uses said monitored speed as said target speed as it is.

9. An intelligent cruise control system according to claim 1, wherein said specially set deceleration target speed is based on a speed of at least one of the moving body and the object of attention, said specially set deceleration target speed not equaling zero.

10. An intelligent cruise control system for a moving body according to claim 9 wherein said operation means is an accelerator pedal and a brake pedal.

11. An intelligent cruise control system for a moving body according to claim 1 further comprising:

a relative-speed control means for adjusting the speed of said moving body by modifying specially determined control gains so as to decrease the relative speed of said moving body with respect to said object of attention;

operation means to be operated by the driver to issue a command requesting car-speed adjustment; and a gain adjusting means for increasing said control gains in accordance with a command for raising the speed of said moving body issued as a result of operating said operation means and, on the other hand, for decreasing said control gains in accordance with a command for reducing the speed of said moving body issued as a result of operating said operation means.

12. An intelligent cruise control system according to claim 10, wherein said specially determined deceleration target speed is based on a speed of at least one of the moving body and the object of attention, said specially determined deceleration target speed not equaling zero.

13. An intelligent cruise control system for a moving body for controlling the cruise of said moving body provided with an engine and a brake, said system comprising:

an attention-object detecting means for measuring the distance from said moving body to an object of attention existing in front of said moving body, the relative speed of said object of attention with respect to said moving body and a relative angle formed by a line connecting said moving body to said object of attention and the running direction of said moving body;

a transversal-position inferring means for calculating the transversal-direction component of said distance from said moving body to said object of attention from said relative angle measured by said attention-object detecting means;

a speed detecting means for measuring the speed of said moving body; and a collision-avoidance control means which is used for decelerating said moving body if:

said relative speed detected by said attention-object detecting means is negative;

the absolute value of said relative speed is greater than the absolute value of said speed of said moving body measured by said speed detecting means;

said transversal-direction component of said distance calculated by said transversal-position inferring means is equal to or smaller than a predetermined value; and said distance from said moving body to said object of attention measured by said attention-object detecting means is equal to or smaller than a specifically determined value.

14. An intelligent cruise control system for a moving body according to claim 13 wherein said collision-avoidance control means selectively uses either an engine brake or said brake in dependence upon the magnitude of said distance from said moving body to said object of attention measured by said attention-object detecting means.

15. An intelligent cruise control system for a moving body according to claim 14 further having a reporting means which is used for reporting that said object of attention is approaching said moving body if:

said relative speed detected by said attention-object detecting means is negative;

the absolute value of said relative speed is greater than the absolute value of said speed of said moving body measured by said speed detecting means;

said transversal-direction component of said distance calculated by said transversal-position inferring means is equal to or smaller than a predetermined value; and said distance from said moving body to said object of attention measured by said attention-object detecting means is equal to or smaller than a specially determined value.

* * * * *